(12) United States Patent
Hadas et al.

(10) Patent No.: US 12,472,648 B1
(45) Date of Patent: Nov. 18, 2025

(54) HUMANOID ROBOT LEG AND A HUMANOID ROBOT

(71) Applicant: Mentee Robotics LTD., Herzliya (IL)

(72) Inventors: Amos Hadas, Tel Aviv (IL); Itai Perez, Bein Yuhushua (IL); Shlomi Azulay, Tel Aviv (IL)

(73) Assignee: Mentee Robotics LTD., Herzliya (IL)

( * ) Notice: Subject to any disclaimer, the term of this patent is extended or adjusted under 35 U.S.C. 154(b) by 205 days.

(21) Appl. No.: 18/458,550

(22) Filed: Aug. 30, 2023

Related U.S. Application Data

(60) Provisional application No. 63/373,996, filed on Aug. 30, 2022.

(51) Int. Cl.
*B25J 5/00* (2006.01)
*B25J 17/00* (2006.01)
*B62D 57/032* (2006.01)

(52) U.S. Cl.
CPC ............ *B25J 17/00* (2013.01); *B62D 57/032* (2013.01)

(58) Field of Classification Search
CPC .................... B25J 17/00; G05B 19/25257
See application file for complete search history.

(56) References Cited

U.S. PATENT DOCUMENTS

2005/0167167 A1* 8/2005 Miyazaki ............. B25J 9/102
180/8.2

FOREIGN PATENT DOCUMENTS

| EP | 1081026 A2 * | 3/2001 | .......... B25J 19/0091 |
| EP | 1083120 A2 * | 3/2001 | .......... B62D 57/032 |
| JP | 2004188505 A * | 7/2004 | |

* cited by examiner

*Primary Examiner* — Karen Masih
(74) *Attorney, Agent, or Firm* — Reches Patents

(57) ABSTRACT

A humanoid robot leg that may include a shank, an ankle that includes an ankle joint that is configured to perform yaw and pitch rotations, a knee joint, multiple ankle related (AR) rotational motors that are in mechanical communication, via multiple AR transmission mechanisms, with the ankle joint, and a knee related (KR) rotational motor that is in mechanical communication, via a KR transmission mechanism, with the knee joint. The multiple AR rotational motors and the KR rotational motor are positioned above the knee joint.

14 Claims, 34 Drawing Sheets

| | |
|---|---|
| Torso 102. | IR motor 131. |
| Right hand 104. | OR motor 132. |
| Left hand 106. | IL motor 133. |
| Right leg 108. | OL motor 134. |
| Left leg 110. | Right yaw motor 135. |
| Right thigh 112. | Left yaw motor 136. |
| Left thigh 114. | Right roll motor 137. |
| Right shank 116. | Left roll motor 138. |
| Left shank 118. | IR AR transmission mechanism 143. |
| Right knee 120. | OR AR transmission mechanism 144. |
| Left knee 122. | IL AR transmission mechanism 145. |
| Right foot 124. | OL AR transmission mechanism 146. |
| Left foot 126. | Right gear 147. |
| Right ankle 128. | Left gear 148. |
| Left ankle 130. | IR AR rotating joint 161. |
| Right knee joint 141. | OR AR rotating joint 162. |
| Left knee joint 142. | IL AR rotating joint 163. |
| IR ring 161'. | OL AR rotating joint 164. |
| OR ring 162'. | IR upper rotational to linear motion mechanism 165. |
| IL ring 163'. | OR upper rotational to linear motion mechanism 166. |
| OL ring 164'. | IL upper rotational to linear motion mechanism 167. |
| Right teethed element 147'. | OL upper rotational to linear motion mechanism 167. |
| Left teethed element 148'. | |

FIG. 2

| |
|---|
| IR lower rotational to linear motion mechanism 171. |
| OR lower rotational to linear motion mechanism 172. |
| IL lower rotational to linear motion mechanism 173. |
| OL lower rotational to linear motion mechanism 174. |
| IR mechanical link protection unit 181. |
| OR mechanical link protection unit 182. |
| IL mechanical link protection unit 183. |
| OL mechanical link protection unit 184. |
| Right knee mechanical link 185. |
| Left knee mechanical link 185'. |
| Lower thigh joint 186. |
| Upper shank joint 187. |
| IR upper AR mechanical link 191. |
| OR upper AR mechanical link 192. |
| IL upper AR mechanical link 193. |
| OL upper AR mechanical link 194. |
| IR intermediate AR mechanical link 195. |
| OR intermediate AR mechanical link 196. |
| IL intermediate AR mechanical link 197. |
| OL intermediate AR mechanical link 198. |

| |
|---|
| IR lower AR mechanical link 201. |
| OR lower AR mechanical link 202. |
| IL lower AR mechanical link 203. |
| OL lower AR mechanical link 204. |
| Right ankle 205. |
| Left ankle 206. |
| Right shank base 207. |
| Left shank base 208. |
| |
| Right ankle joint 211. |
| Left ankle joint 212. |
| IR ankle interface 213. |
| OR ankle interface 214. |
| IL ankle interface 215. |
| OL ankle interface 216. |
| Right hip pitch joint 221. |
| Left hip pitch joint 222. |
| Right hip roll joint 223. |
| Left hip roll joint 224. |
| Waist frame 225 |
| Right shank top 311 |
| Left shank top 312 |
| Right hip pitch motor 221'. |
| Left hip pitch motor 222'. |
| Right hip roll motor 223'. |
| Left hip roll motor 224'. |

FIG. 3

| | |
|---|---|
| Torso Roll Joint 226. | IR Threaded Mechanical Element 261. |
| Torso Roll Motor 227. | OR Threaded Mechanical Element 262. |
| Torso Pitch Joint 228. | IL Threaded Mechanical Element 263. |
| Torso Pitch Motor 229. | OR Threaded Mechanical Element 264. |
| Right Hand Transmission Mechanism 230. | IR Nut 265. |
| Right Elbow Joint 231. | OR Nut 266. |
| Right Shoulder Pitch Joint 232. | IL Nut 267. |
| Right Shoulder Yaw Joint 232'. | OL Nut 268. |
| Right Elbow Motor 234. | First IR AR Rotational Joint. 271 |
| Right Shoulder Pitch Motor 235. | Second IR AR Rotational Joint. 272 |
| Right Shoulder Yaw Motor 235'. | First OR AR Rotational Joint. 273 |
| Right Elbow Joint 236. | Second OR AR Rotational Joint. 274 |
| Right Hand Segment 237. | First IL AR Rotational Joint. 275 |
| Right wrist joint 238. | Second IL AR Rotational Joint. 276 |
| Right wrist motor 239. | First OL AR Rotational Joint. 277 |
| Left Hand Transmission Mechanism 240. | Second OL AR Rotational Joint. 278 |
| Left Elbow Joint 241. | Right Knee Motor 297 |
| Left Shoulder Pitch Joint 242. | Left Knee Motor 298 |
| Left shoulder yaw joint 242' | Right Knee Threaded Mechanical Element 301 |
| Left Elbow Motor 244. | Right Knee Nut 302 |
| Left Shoulder Pitch Motor 245. | Right Knee Upper Rotational Joint 303 |
| Left Shoulder Yaw Motor 245'. | Right Knee Lower Rotational Joint 304 |
| Left Elbow Joint 246. | Left Knee Threaded Mechanical Element 305 |
| Left Hand Segment 247. | Left Knee Nut 306 |
| Left wrist joint 248. | Left Knee Upper Rotational Joint 307 |
| Left wrist motor 249. | Left Knee Lower Rotational Joint 308 |

FIG. 4

HUMANOID ROBOT LEG AND A HUMANOID ROBOT

CROSS REFERENCE

This application claims priority from U.S. provisional patent filing date Aug. 30, 2023, Ser. No. 63/373,996 which is incorporated herein by reference.

BACKGROUND

A humanoid robot is a robot resembling the human body in shape. The design may be for functional purposes, such as interacting with human tools and environments, for experimental purposes, such as the study of bipedal locomotion, or for other purposes. In general, many humanoid robots have a torso, a head, two arms, and two legs, though some humanoid robots may replicate only part of the body, for example, from the waist up. Some humanoid robots also have heads designed to replicate human facial features such as eyes and mouths. Androids are humanoid robots built to aesthetically resemble humans (www.wikipedia.org).

Humanoid robots are expected to perform household chores, perform low-skill tasks, and gradually perform more complex tasks-especially tasks that involve some human interaction.

The cost of current humanoid robots is high and they tend to be cumbersome, error prone, and complex.

There is a growing need to provide a humanoid robot that is robust and lightweight.

SUMMARY

There may be provided a humanoid robot leg that may include a shank, an ankle that comprises an ankle joint that is configured to perform yaw and pitch rotations, a knee joint, multiple ankle related (AR) rotational motors that are in mechanical communication, via multiple AR transmission mechanisms, with the ankle joint, a knee related (KR) rotational motor that is in mechanical communication, via a KR transmission mechanism, with the knee joint, wherein the multiple AR rotational motors and the KR rotational motor are positioned above the knee joint.

The humanoid robot leg may include a yaw rotational motor that may be positioned above the knee joint and may be in mechanical communication with a gear that may be configured to perform a yaw rotation of at least the knee joint and the shank.

A center of weight of the humanoid robot leg may be located above the knee joint.

The multiple AR transmission mechanisms may include AR rotating joints that may be located in proximity to the knee joint and may be positioned at opposite sides of the knee joint.

The multiple AR transmission mechanisms may include AR rotating joints that may be thin.

The multiple AR transmission mechanisms may include AR rotating joints that rotate about a AR rotation axis that may be proximate to a rotation axis of the knee joint.

The multiple AR transmission mechanisms may include AR rotating joints that rotate about a AR rotation axis that equals a rotation axis of the knee joint The AR transmission mechanism may include an upper rotational to linear motion mechanism that may be configured to convert a rotational motion of a AR rotational motor to a first linear movement.

The upper rotational to linear motion mechanism may be positioned above the knee joint.

The AR transmission mechanism also may include an AR rotating joint that may be rotatable about a AR rotation axis and may be configured to convert, by rotation, the first linear movement to a second linear movement.

The AR transmission mechanism also may include a lower AR transmission mechanism that translates the second linear movement to a movement of an first interfacing point of the ankle.

The lower AR transmission mechanism may include a mechanical link protection unit that may be configured to prevent buckling of mechanical links of the lower AR transmission mechanism.

The lower AR transmission mechanism may include a upper mechanical link, a mechanical link protection unit and an ankle mechanical link.

One end of the upper mechanical link may be in mechanical communication with one end of the AR rotating joint and with a first end of mechanical link protection unit; and one end of the ankle mechanical link may be in mechanical communication with another end of the mechanical link protection unit and with a first contact point with the ankle.

The rotational movement of the AR rotational movement may be a rotational movement of a threaded mechanical element, and the AR transmission mechanism may include a nut with an internal screw thread, the nut may be located above the knee joint.

The humanoid robot leg may include a pitch hip joint and a pitch hip motor that may be positioned above the multiple AR rotational motors and may be configured to perform pitch rotations of the humanoid robot leg.

The humanoid robot leg may include a roll hip joint and a roll hip motor that may be positioned above the multiple AR rotational motors and may be configured to perform roll rotations of the humanoid robot leg.

There may be provided a humanoid robot leg that may include a shank, an ankle that may include an ankle joint that may be configured to perform yaw and pitch rotations, a knee joint, multiple AR rotational motors that may be in mechanical communication, via multiple AR transmission mechanisms, with the ankle joint; a AR transmission mechanism may include a AR rotating joint that may be connected to an upper link and to a lower link, the AR rotating joint may be configured to convert a linear motion of the upper link to a linear motion of the lower link, upper rotational to linear motion mechanisms, an upper rotational to linear motion mechanism may be configured to convert a rotational motion of a AR rotational motor to a first linear movement that drives the upper link; and the multiple AR rotational motors and the KR rotational motor may be positioned above the knee joint.

There may be provided a humanoid robot leg that may include a shank, leg joints that may include an ankle joint and a knee joint, multiple rotational motors that may be in mechanical communication, via multiple transmission mechanisms with the leg joints; the multiple rotational motors may be independently controlled; at least one leg joint may be impacted by a movement of two or more rotational motors of the multiple rotational motors, and the multiple rotational motors may be positioned above a knee joint of the leg joints.

The transmission mechanisms may include threaded mechanical elements that may be rotatable by the multiple rotational motors, and nuts with internal screw threads that may be coupled to the threaded mechanical elements.

The humanoid robot leg AR transmission mechanism may be configured to convert a rotational movement of a AR threaded mechanical element that may be rotated by a AR rotational motor to a linear movement of a AR nut; and a movement of the knee joint by KR transmission mechanism may be translated to a movement of the AR nut.

There may be provided a humanoid robot that may include arms that may include hands, a torso, a waist, shoulder joints that may be configured to mechanically couple the arms to the torso, one or more waist joints that may be configured to mechanically couple the torso to the waist, multiple legs that may include multiple knee joints, and hip joints that may be configured to mechanically couple the multiple legs to the waist. The humanoid robot may be configured to move the arms between (i) a bottom front position in which the hands may be in front of the torso and below the torso, and (ii) a bottom rear position in which the hands may be behind the torso and below the torso.

The humanoid robot may be configured to move the arm between the bottom front position and the bottom rear position without rotating the torso about a yaw axis.

The humanoid robot may be configured to move the arm between the bottom front position and the bottom rear position by rotating the torso about a yaw axis and rotating the shoulder joints about a yaw axis.

The hands may be configured to hold an object during a movement of the arms between the bottom front position and the bottom rear position.

The torso may be an upmost part of the humanoid robot.

The humanoid robot may include a display that covers a majority of the torso.

There may be provided a humanoid robot leg mechanical frame, that consist essentially of a shank, an ankle that may include an ankle joint that may be configured to perform yaw and pitch rotations, a knee joint, multiple AR rotational motors that may be in mechanical communication, via multiple AR transmission mechanisms, with the ankle joint, a KR rotational motor that may be in mechanical communication, via a KR transmission mechanism, with the knee joint. The multiple AR rotational motors and the KR rotational motor may be positioned above the knee joint There may be provided a humanoid robot leg mechanical frame, consisting essentially of a shank, an ankle that may include an ankle joint that may be configured to perform yaw and pitch rotations, a knee joint, multiple AR rotational motors that may be in mechanical communication, via multiple AR transmission mechanisms, with the ankle joint, a AR transmission mechanism may include a AR rotating joint that may be connected to an upper link and to a lower link, the AR rotating joint may be configured to convert a linear motion of the upper link to a linear motion of the lower link, upper rotational to linear motion mechanisms, an upper rotational to linear motion mechanism may be configured to convert a rotational motion of a AR rotational motor to a first linear movement that drives the upper link. The multiple AR rotational motors and the KR rotational motor may be positioned above the knee joint.

There may be provided a humanoid robot leg mechanical frame, consisting essentially of a shank, leg joints that may include an ankle joint and a knee joint, multiple rotational motors that may be in mechanical communication, via multiple transmission mechanisms with the leg joints. The multiple rotational motors may be independently controlled. At least one leg joint may be impacted by a movement of two or more rotational motors of the multiple rotational motors. The multiple rotational motors may be positioned above a knee joint of the leg joints.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2-4 illustrates examples of various components of the HR;

DETAILED DESCRIPTION OF THE DRAWINGS

Figure 1:
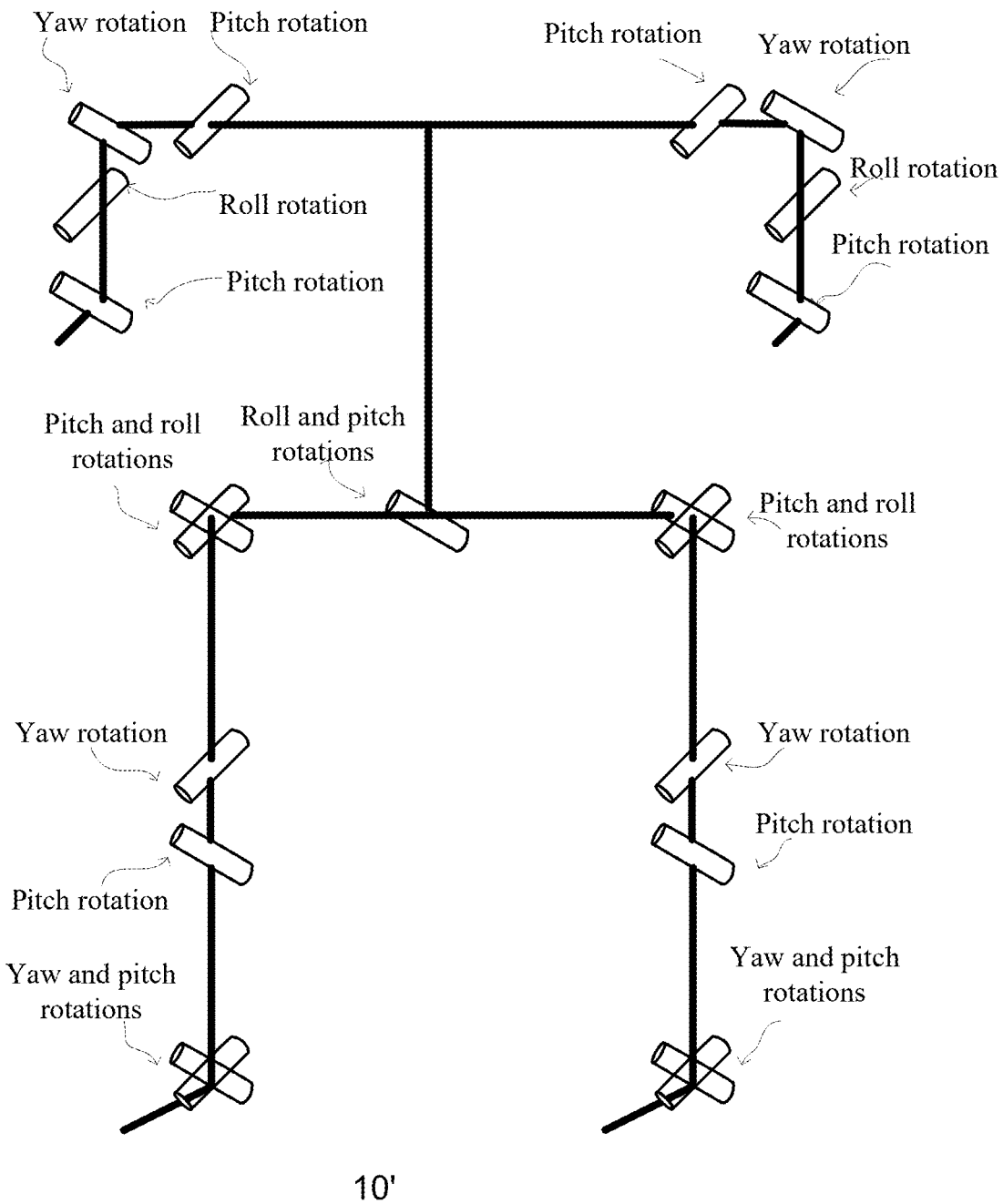
FIG. 1 is an example of a kinematic structure of a humanoid robot (HR)

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using mechanical components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Any reference to "comprising" or "having" may be applicable, mutatis mutandis, to "consisting essentially of". Any reference to "comprising" or "having" may be applicable, mutatis mutandis, to "consisting".

The term ankle related (AR) means a mechanical element that impacts a movement of an ankle of the HR.

The term knee related (KR) means a mechanical element that impacts a movement of a knee of the HR.

The term inner right (IR) means located at an inner part of the right leg of the HR. The inner part of the right leg is the part that is closest to the left leg.

The term inner left (IL) means located at an inner part of the left leg of the HR. The inner part of the left leg is the part that is closest to the right leg.

The term outer right (OR) means located at an outer part of the right leg of the HR.

The term outer left (OL) means located at an outer part of the left leg of the HR.

The following description refers to a frame or the mechanical skeleton of an HR. The HR may include additional components such as an exterior, computerized components, power sources, and the like. For simplicity of explanation the frame of the HR will be referred to as the HR.

There may be provided a HR that has an above-knee center of gravity (COG) that allows the HR to perform various movements with minimal impact on the COG.

FIG. 1 illustrates an example of a kinematic structure 10' of the HR that illustrates that:
  a. Ankle joints may perform yaw and pitch rotations.
  b. Knee joints may perform pitch rotations.
  c. Above the knee (below the hip) joints may perform yaw rotations.
  d. Hip joints may perform pitch and roll rotations.
  e. Torso joints may perform a pitch and roll rotations.
  f. Shoulder joints may perform pitch, and yaw rotations.
  g. Elbow joints may perform a roll rotation.
  h. Wrist joints may perform a pitch rotation.

It should be noted that additional and/or other rotational movements may be performed by different joints of the HR.

Figure 5:
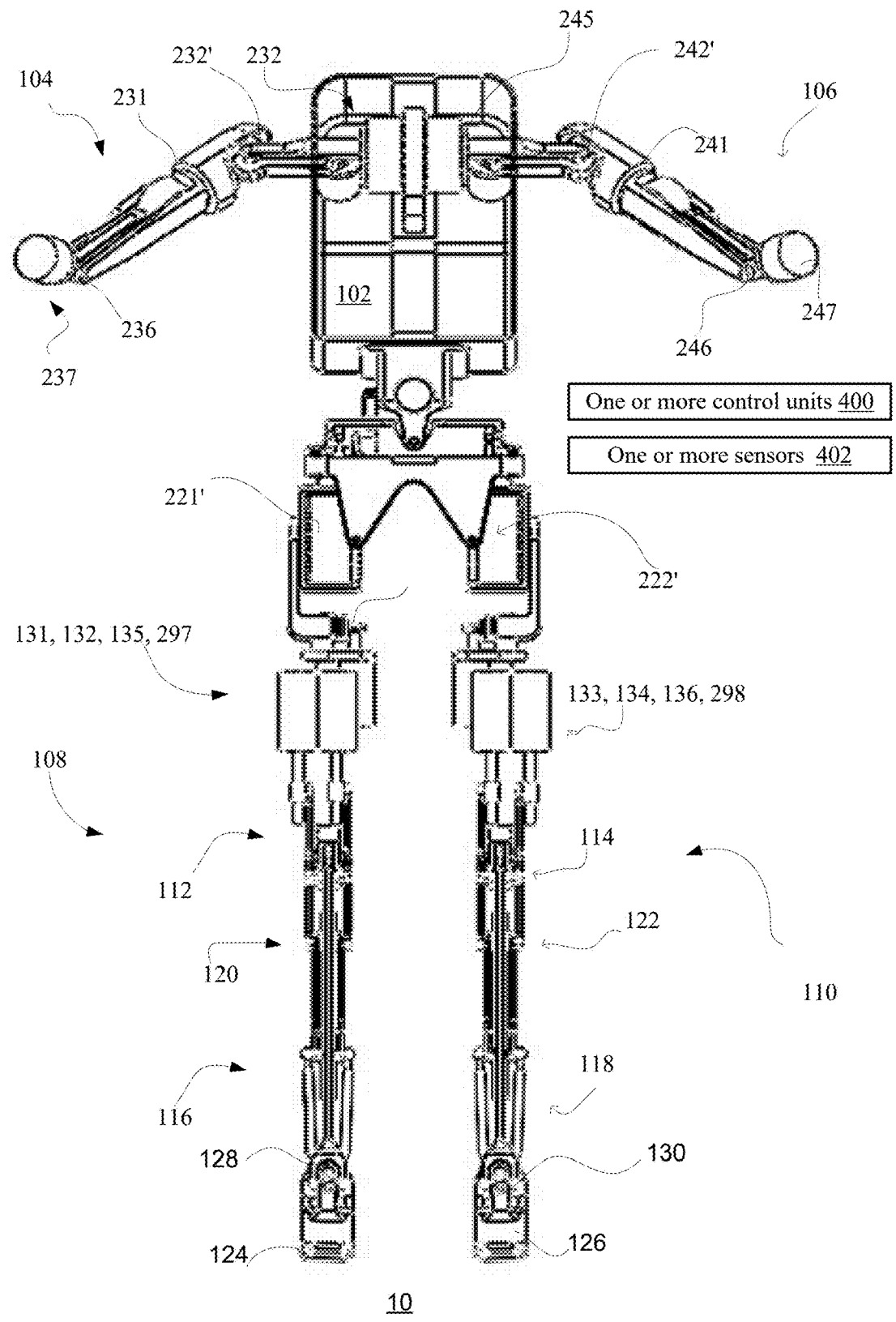
FIG. 5 is a front view of an example of an HR where the torso parallel to the legs of the HR.
Figure 6:
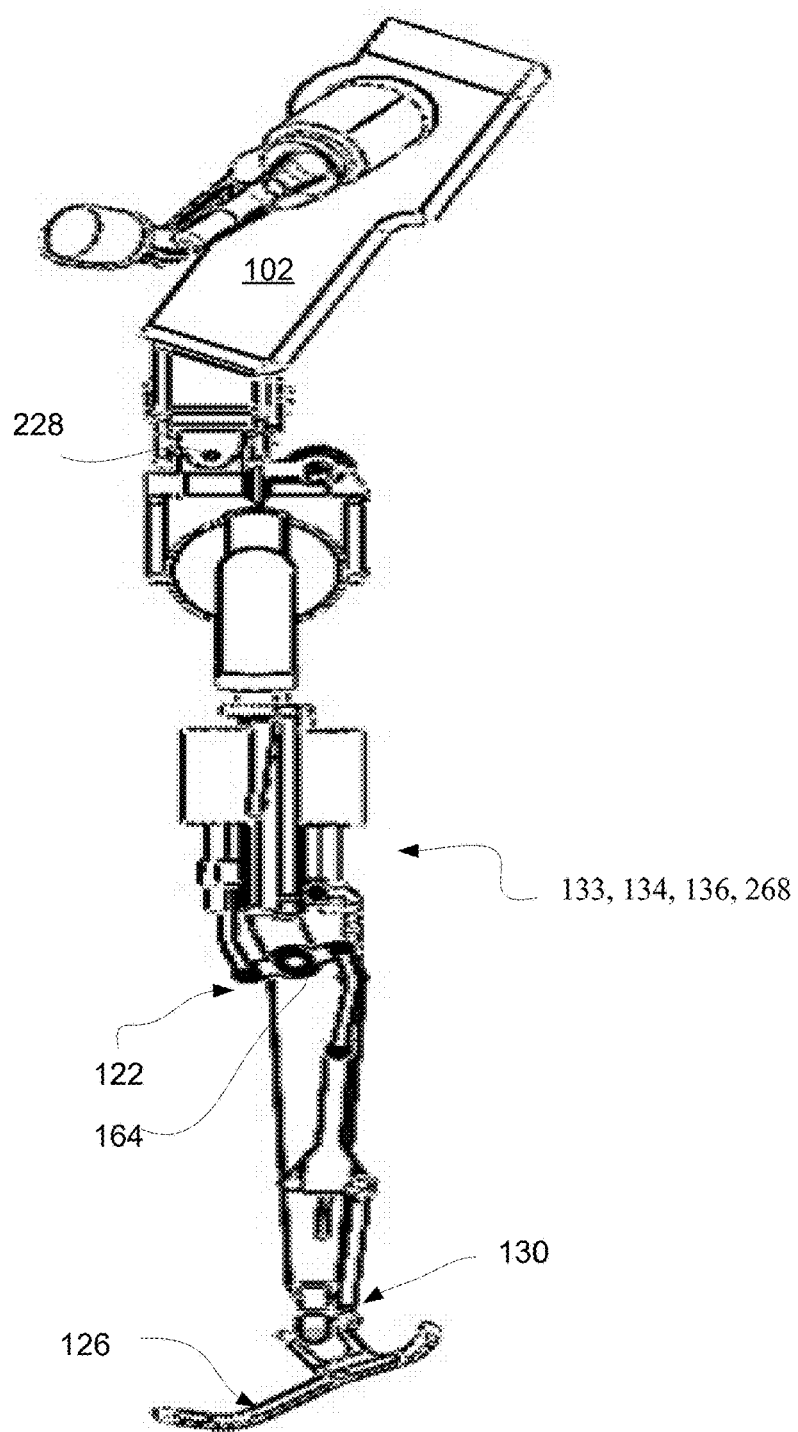
FIG. 6 is a side view of an example of the HR where the torso is tilted backwards.
Figure 7:
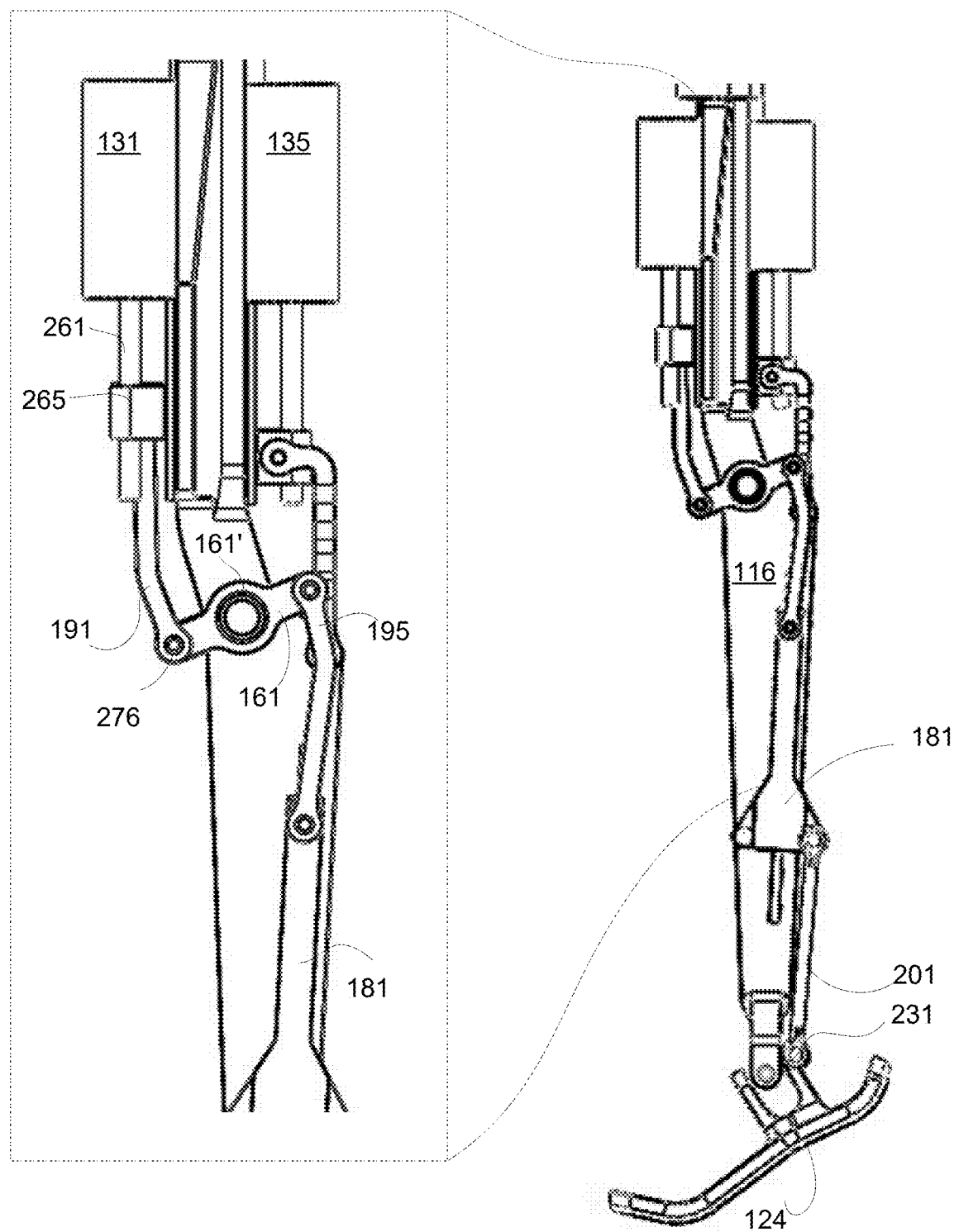
FIG. 7 is a side view of an example of a leg of the HR.
Figure 8:
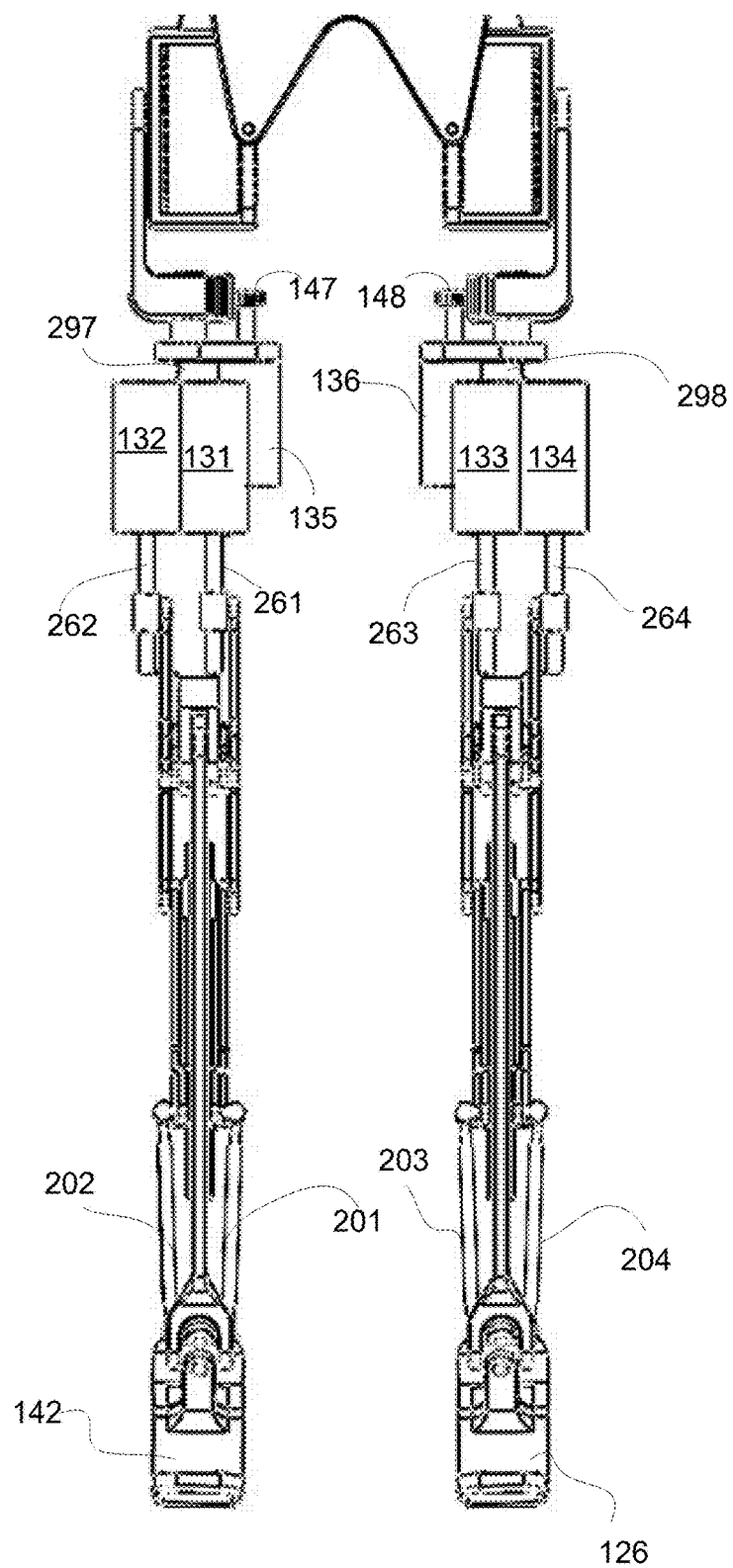
FIG. 8 is a front view of an example of two legs of the HR that are parallel to each other.
Figure 9:
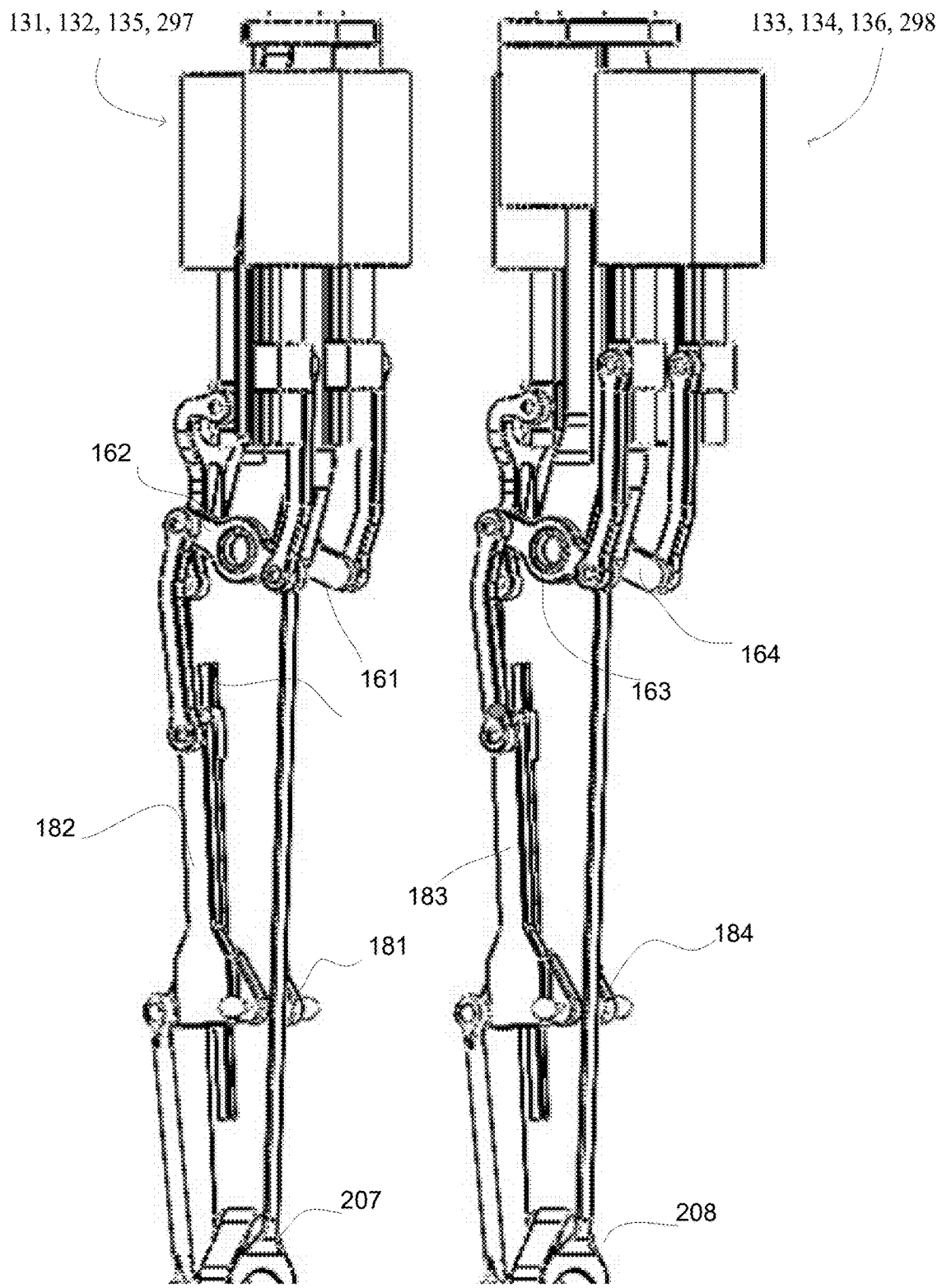
FIG. 9 is a perspective view of an example of two legs of the HR.
Figure 10:
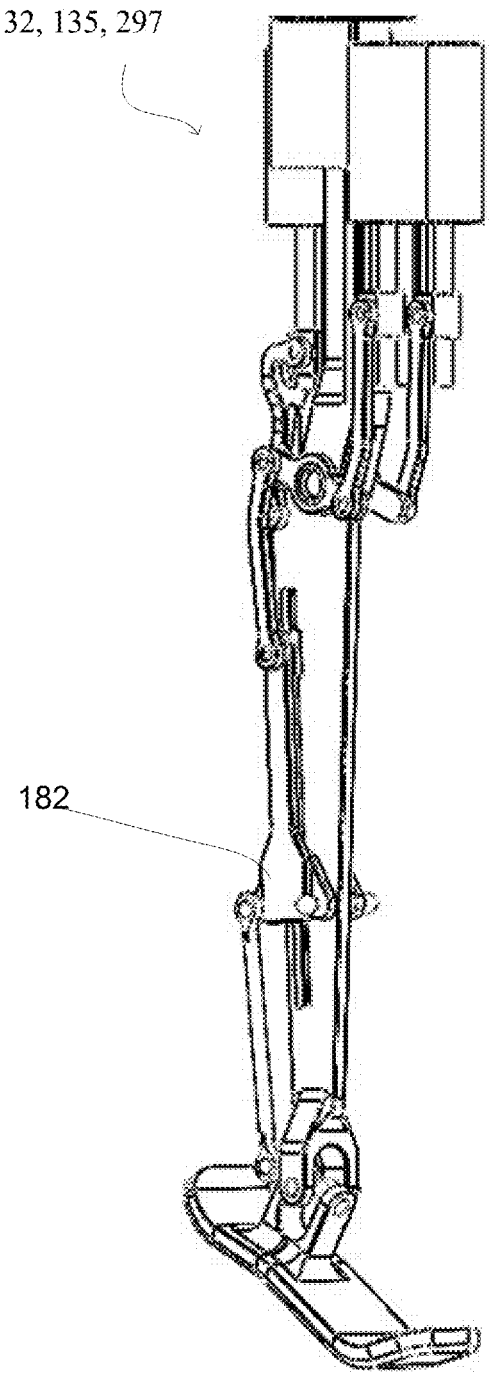
FIG. 10 is a perspective view of an example of a leg of the HR.
Figure 11:
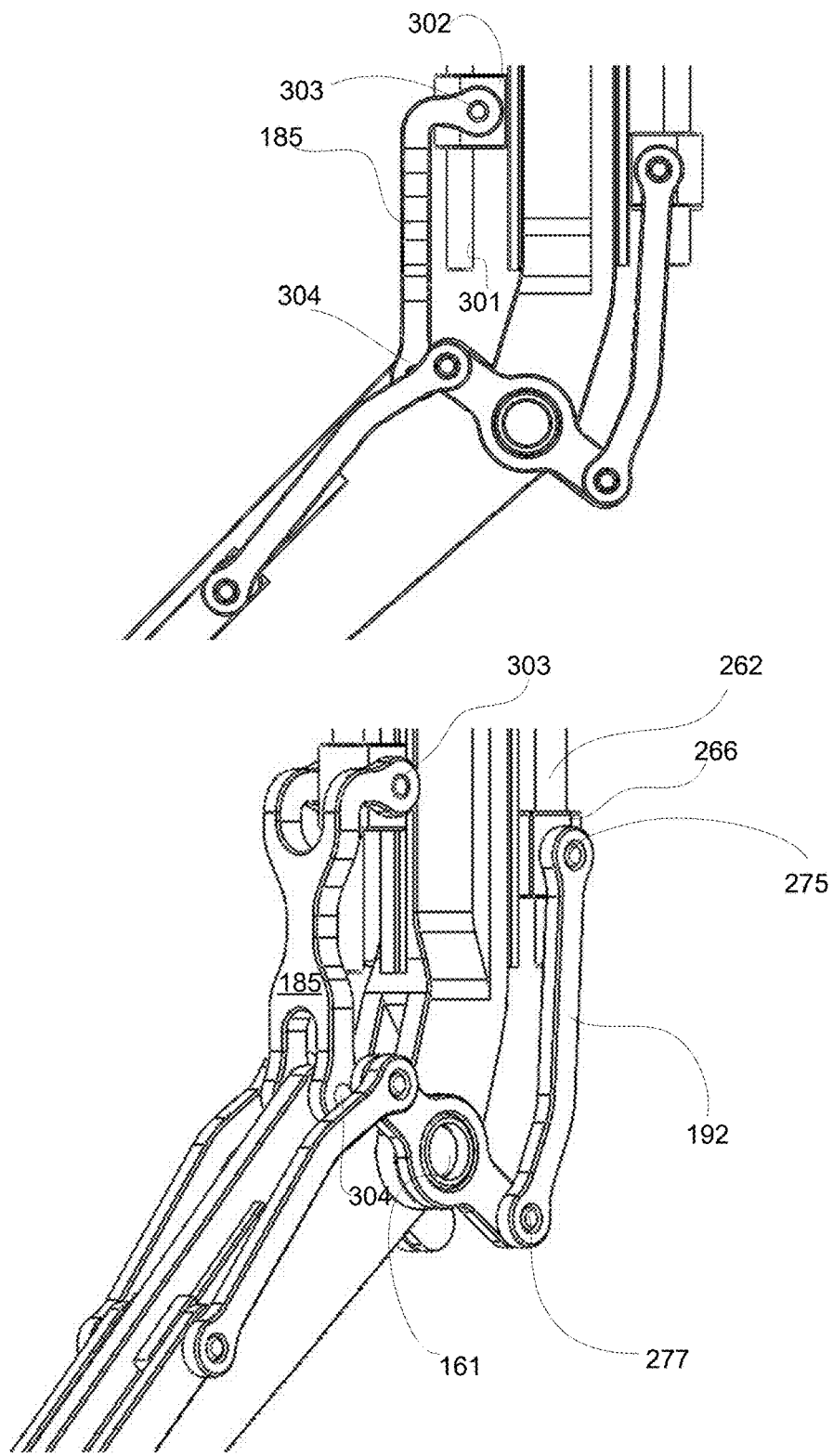
FIG. 11 is a perspective view and a side view of an example of a knee of the HR.
Figure 12:
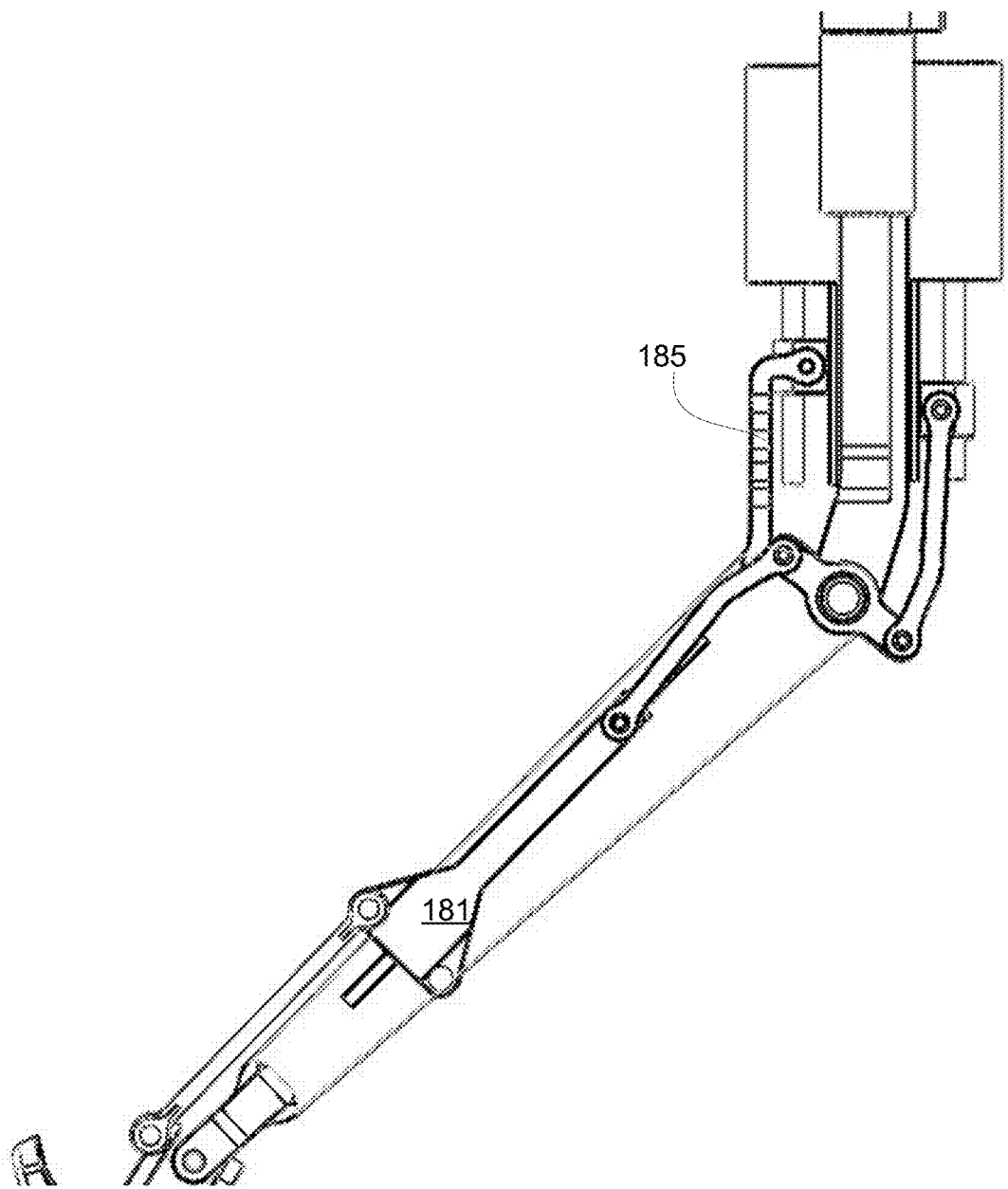
FIG. 12 is a side view of an example of a knee of the HR.
Figure 13:
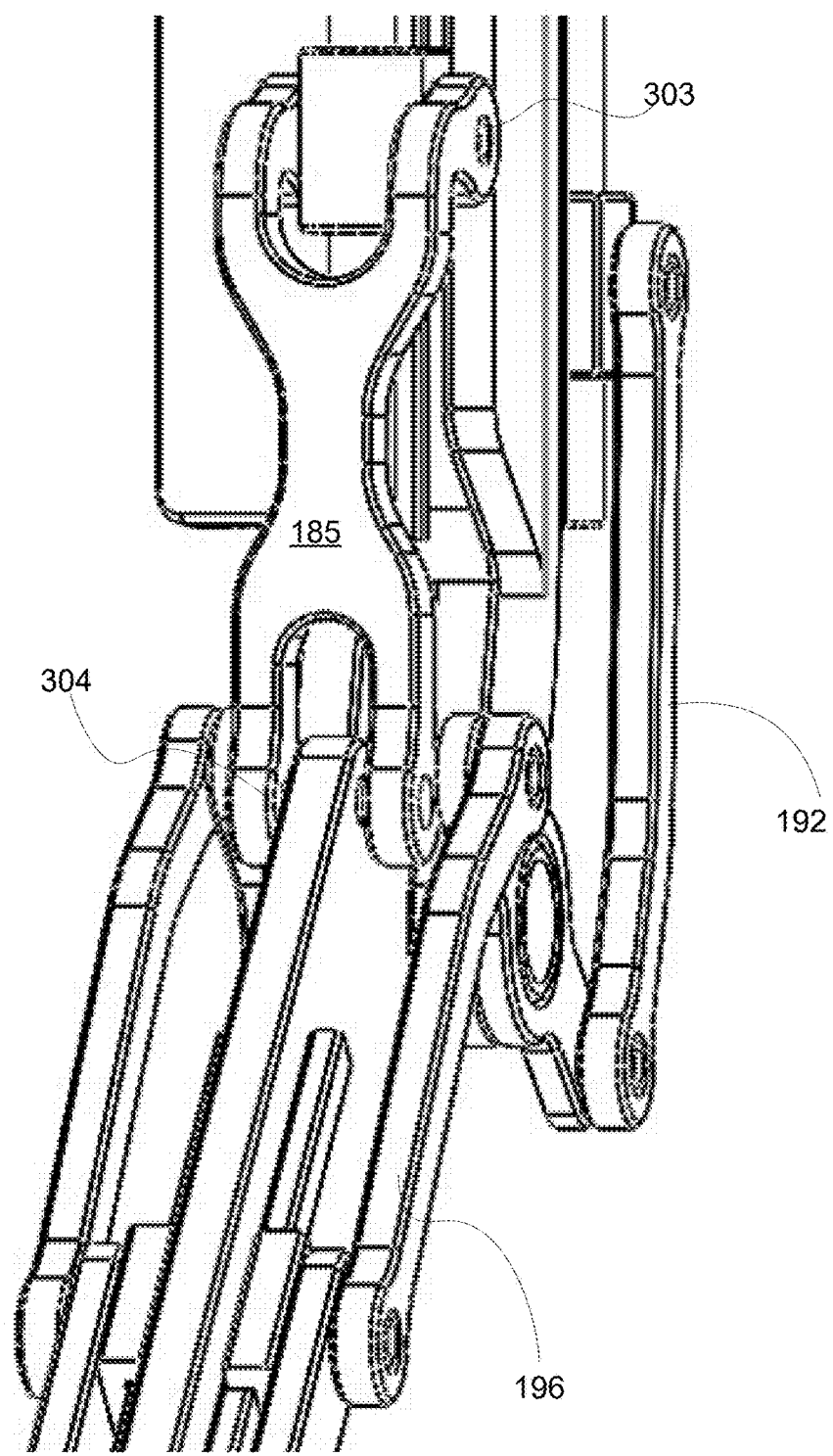
FIG. 13 is a perspective view of an example of a knee of the HR.
Figure 14:
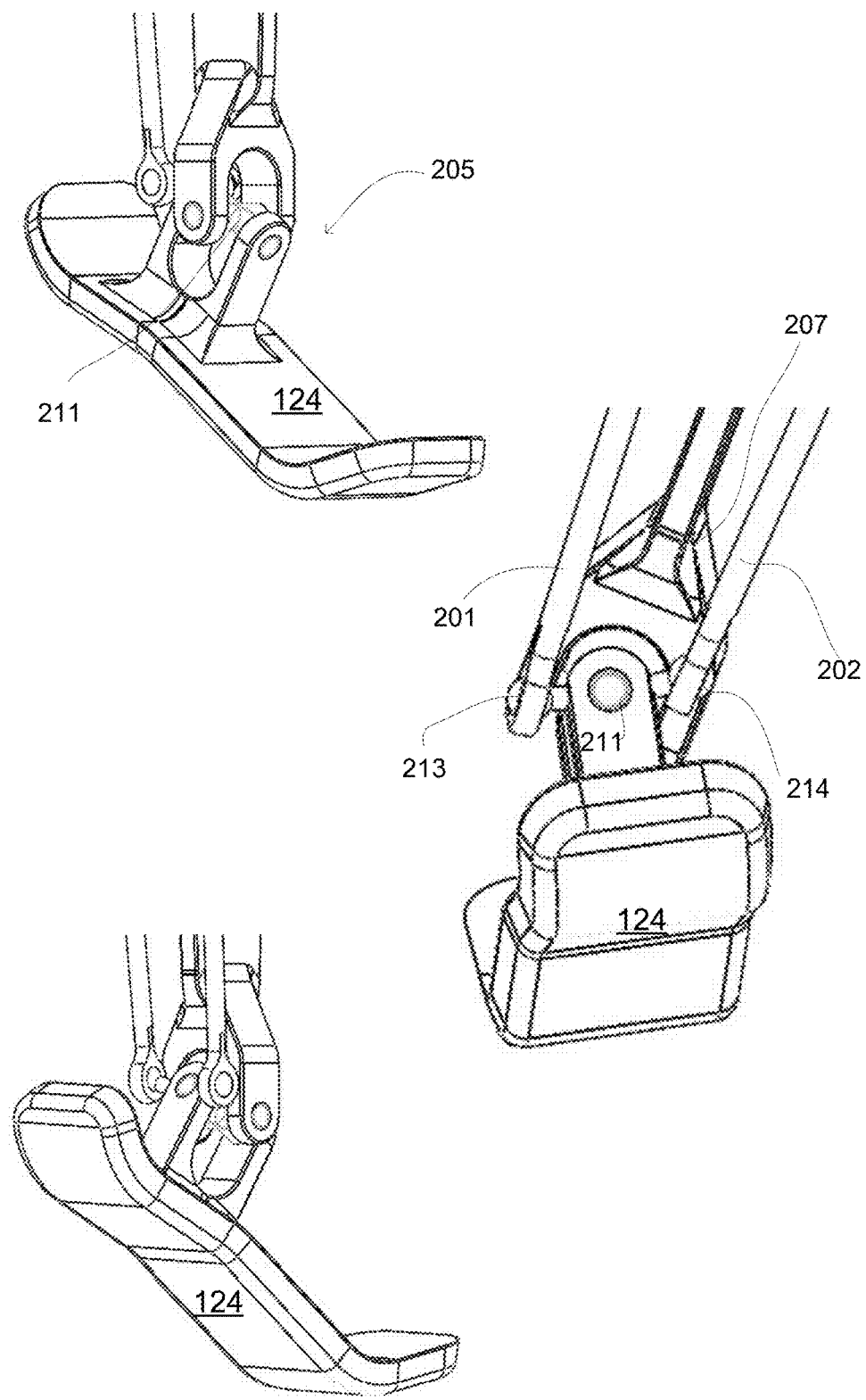
FIG. 14 is a perspective view of an example of a foot and an ankle of the HR.
Figure 15:
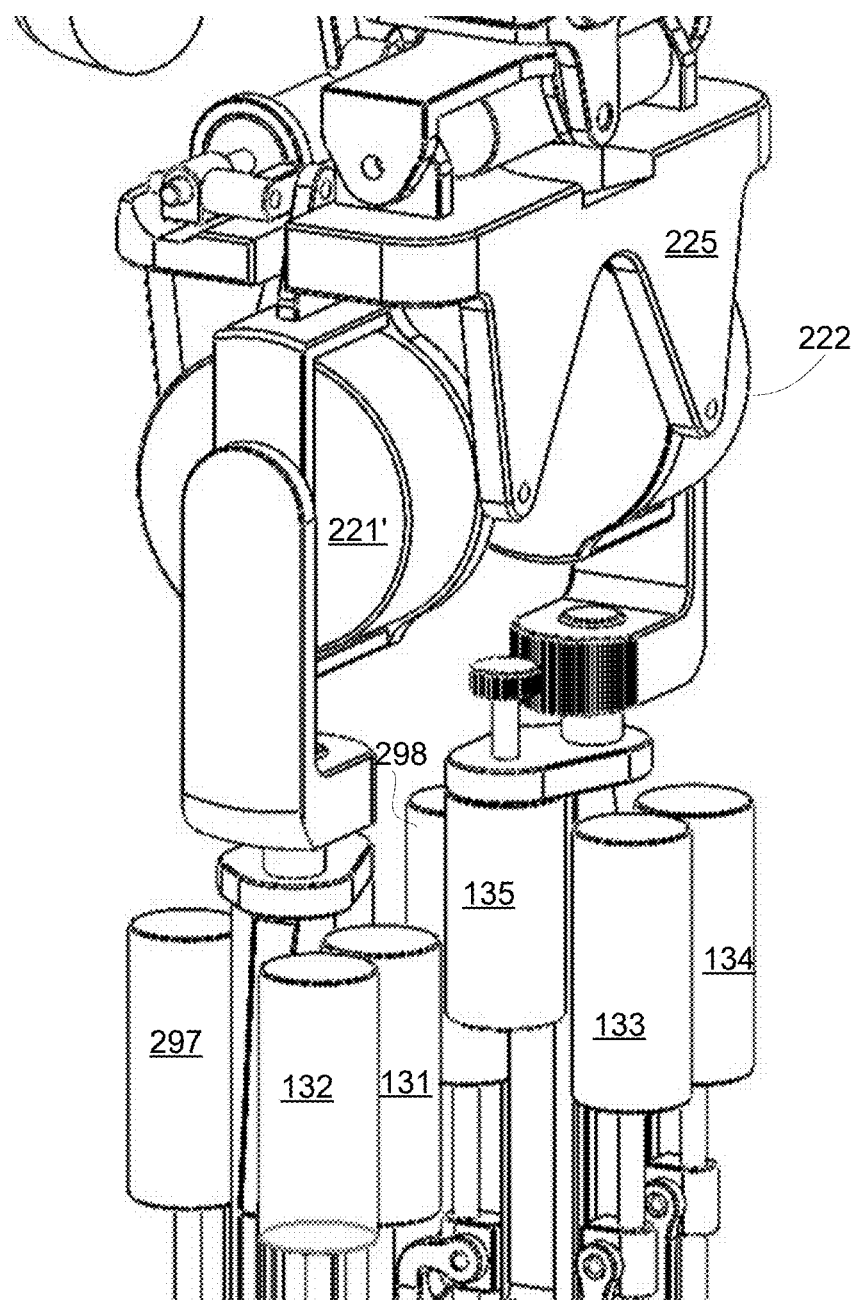
FIG. 15 is a perspective view of an example of a center of the HR.
Figure 16:
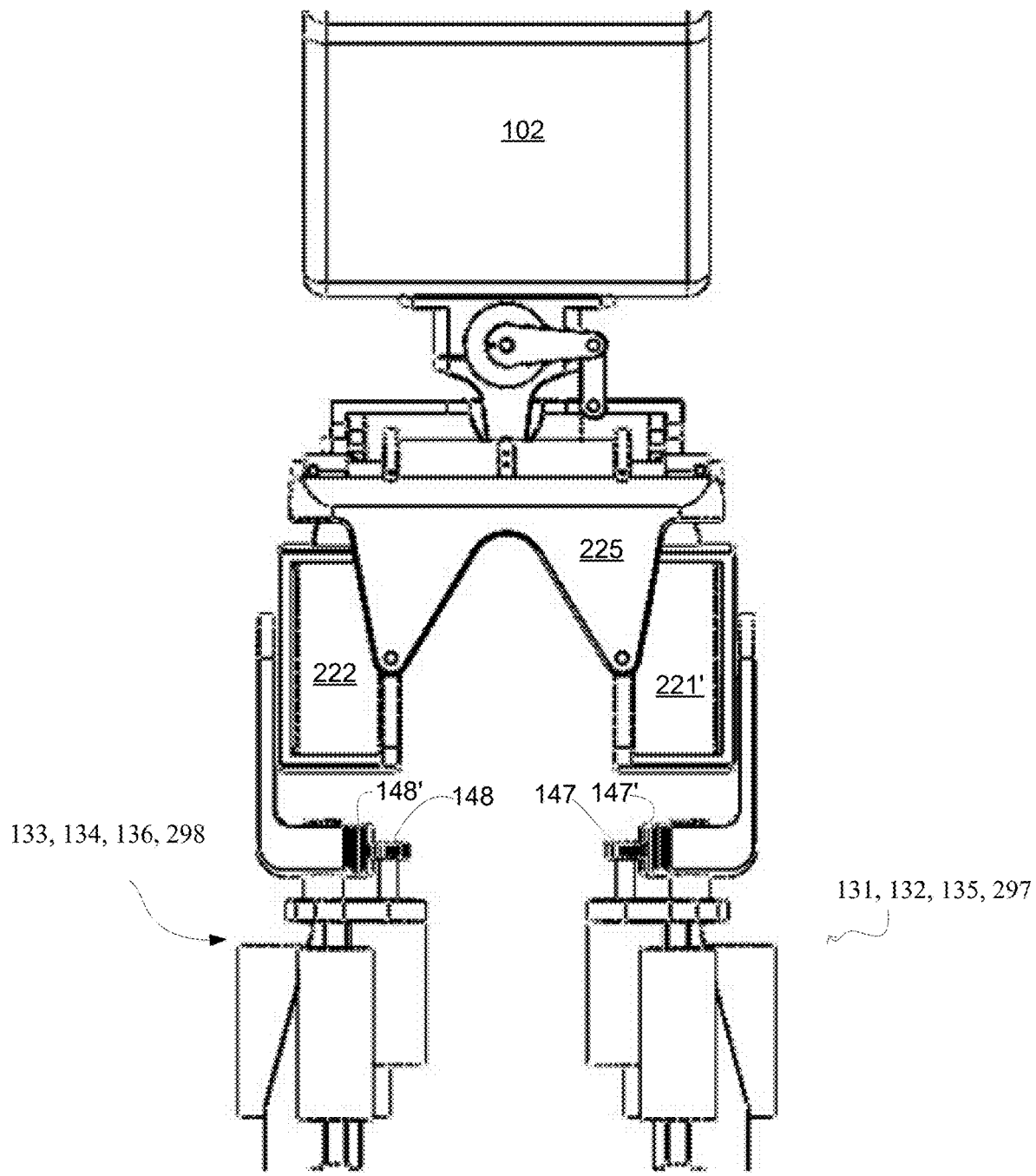
FIG. 16 is a front view of an example of a center of the HR.
Figure 17:
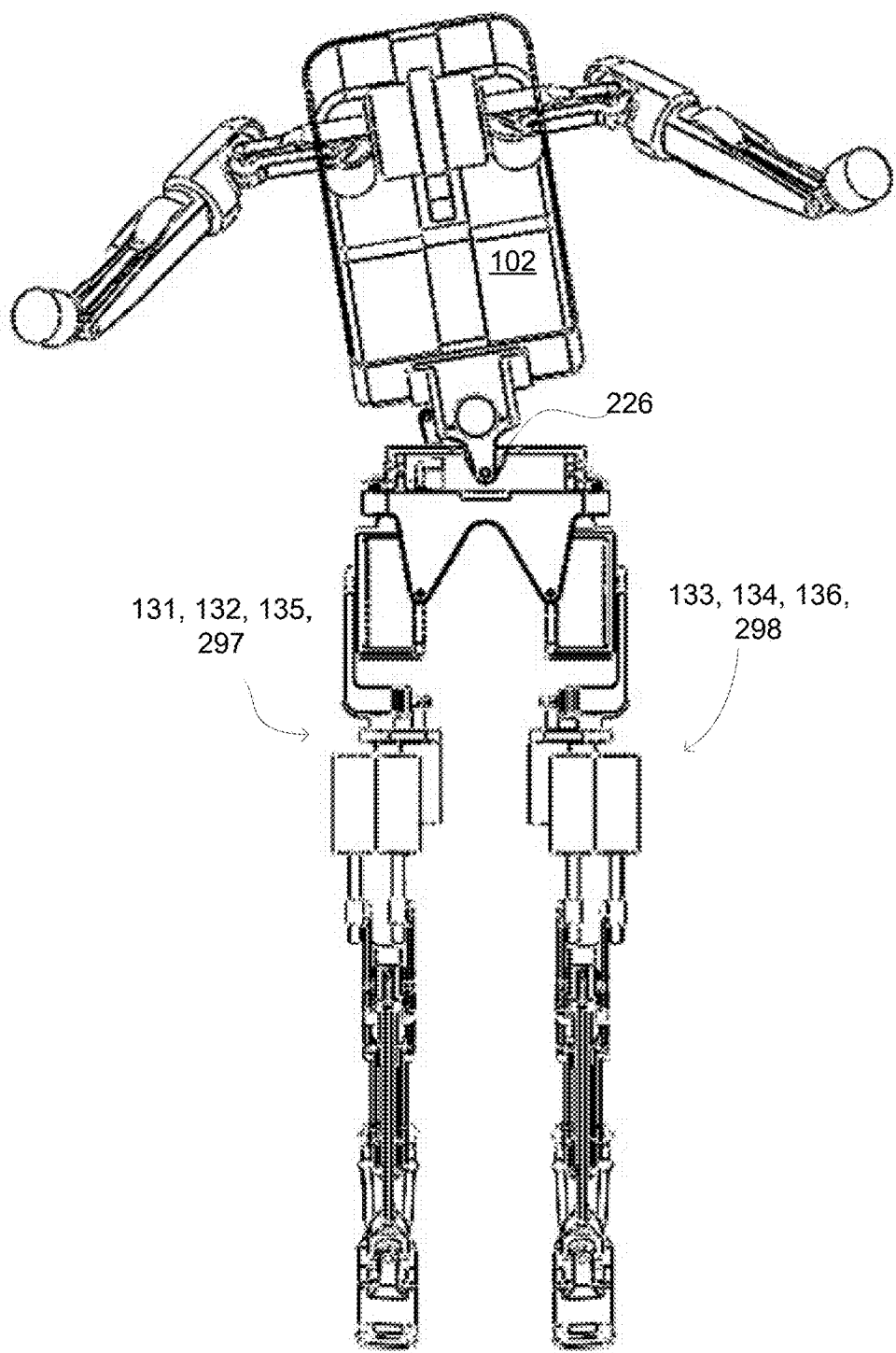
FIG. 17 is a front view of an example of the HR where the torso is rotated to the right of the HR.
Figure 18:
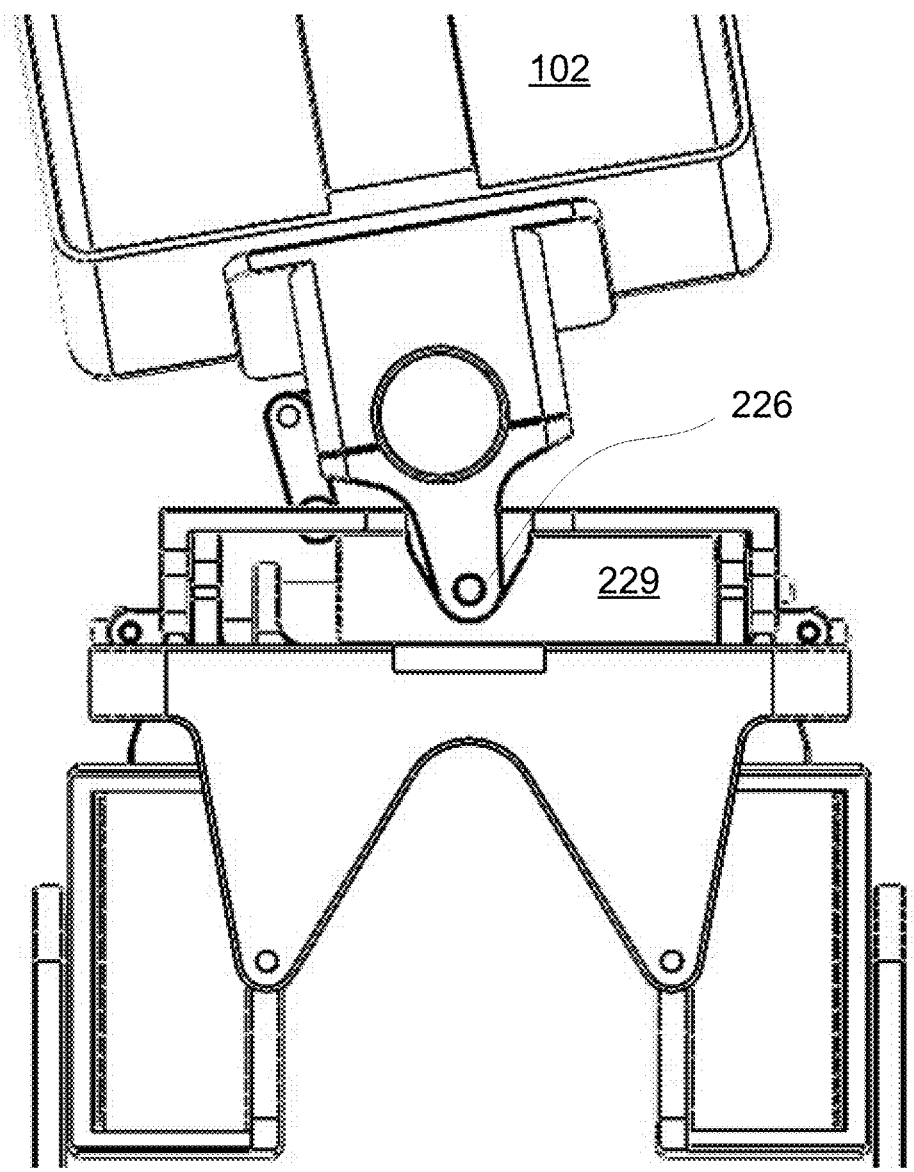
FIG. 18 is a front view of an example of the center of the HR where the torso is rotated to the right of the HR.
Figure 19:
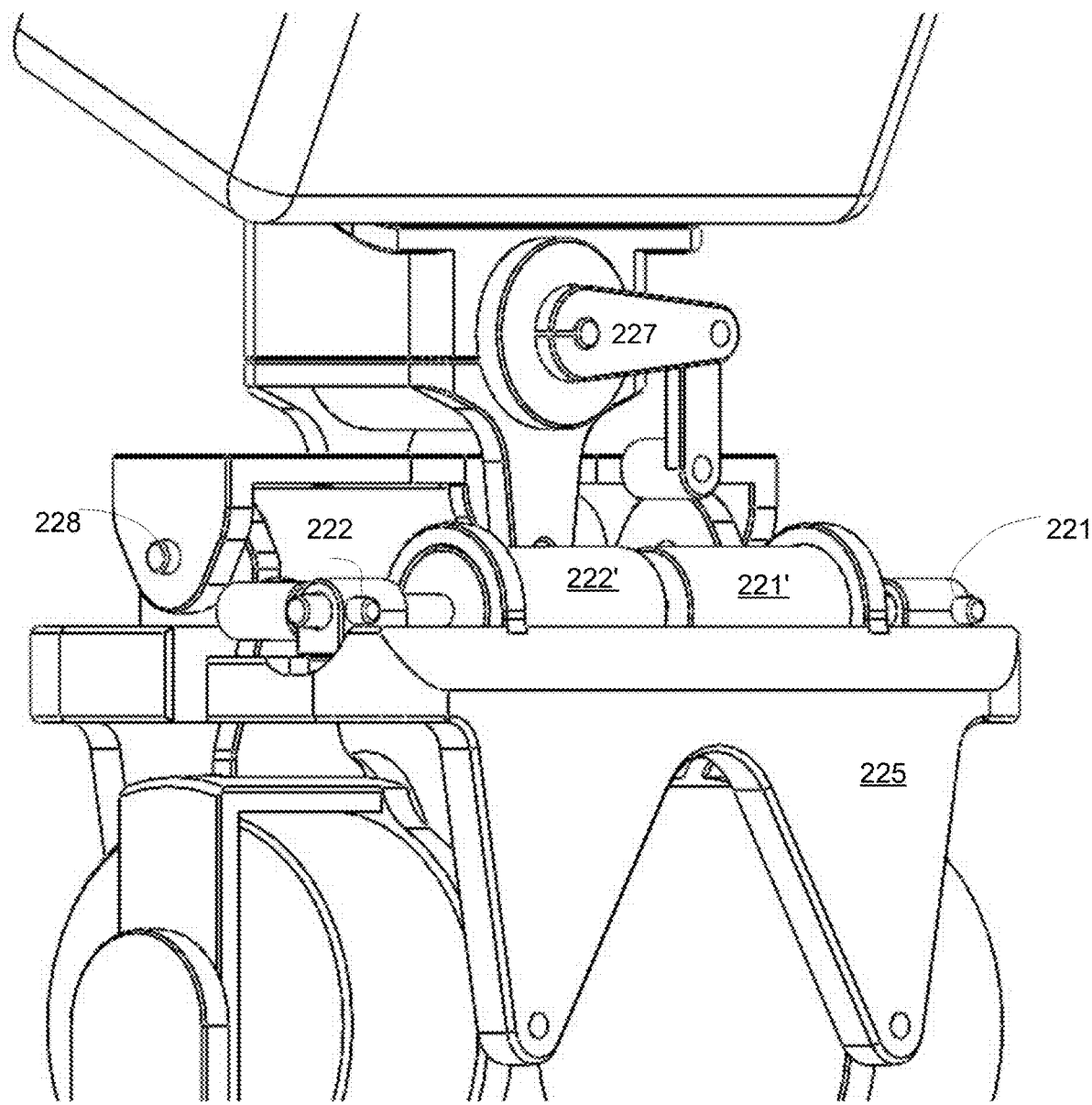
FIG. 19 is a front view of an example of the center of the HR where the torso is rotated backwards.
Figure 20:
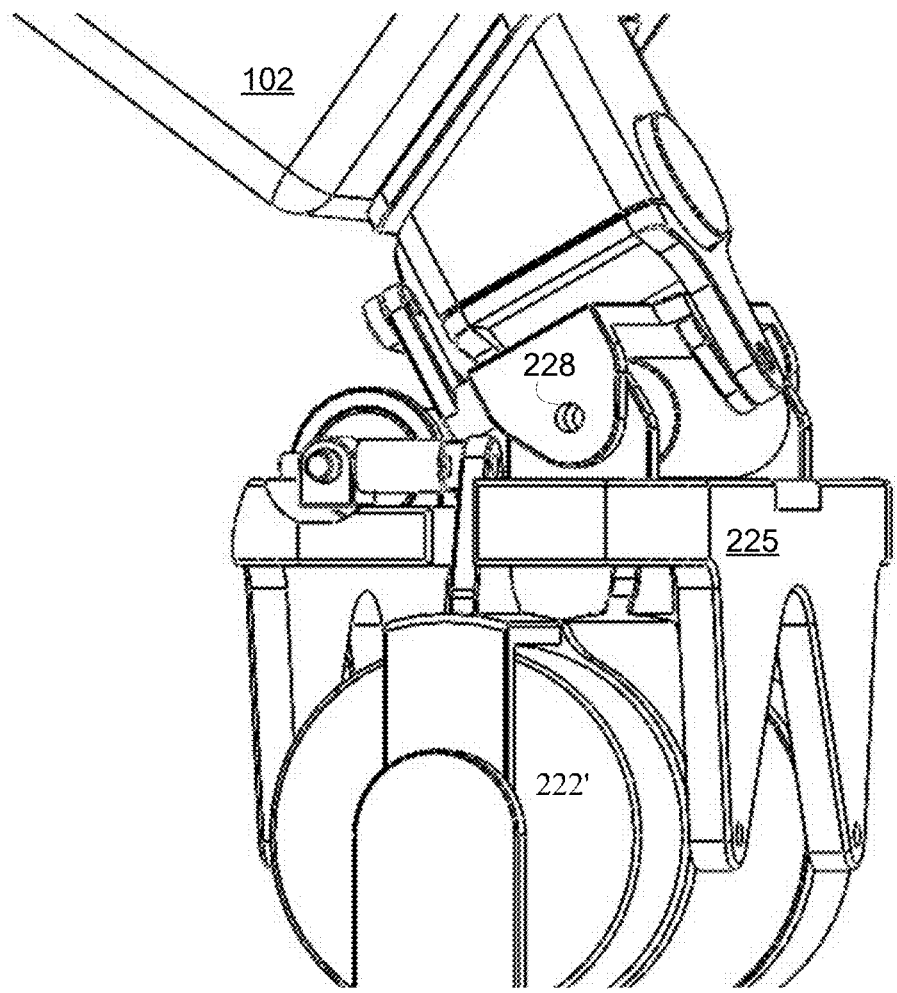
FIG. 20 is a perspective view of an example of the center of the HR where the torso is rotated forwards.
Figure 21:
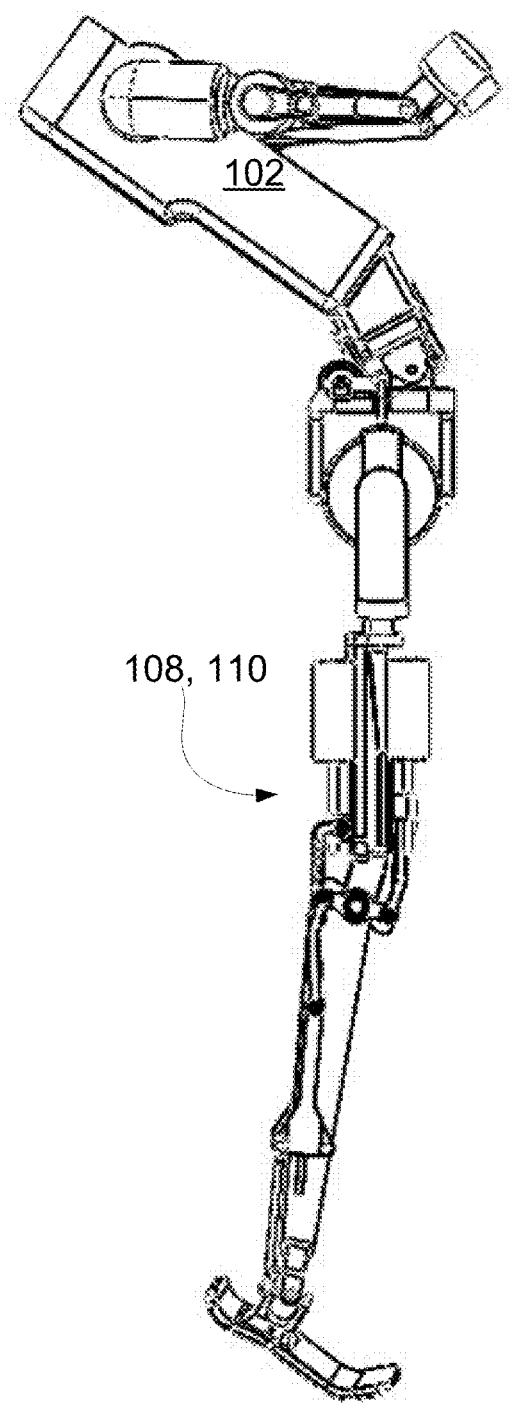
FIG. 21 is a side view of an example of the HR where the torso is rotated forwards.
Figure 22:
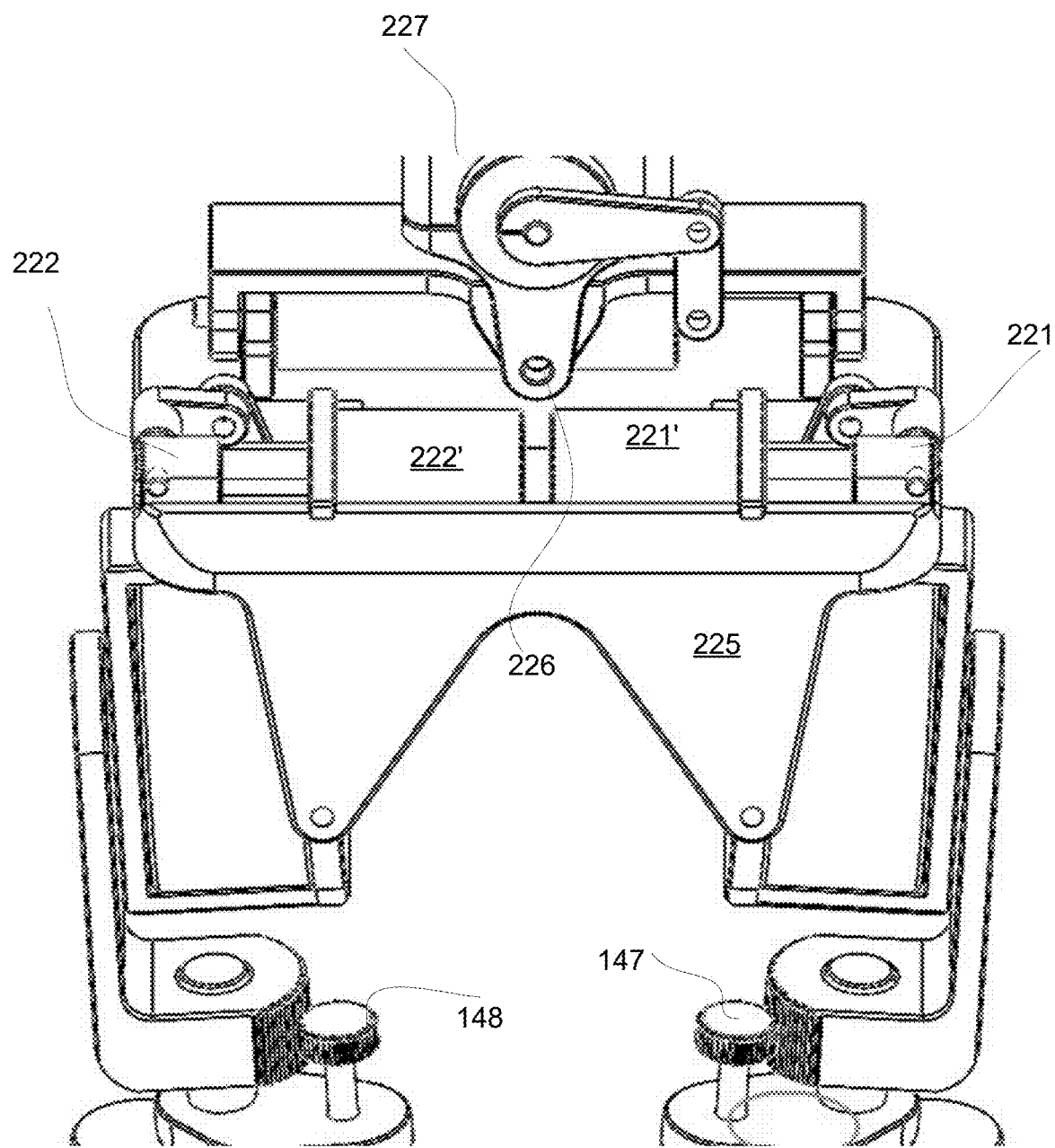
FIG. 22 is a perspective view of an example of the center of the HR.
Figure 23:
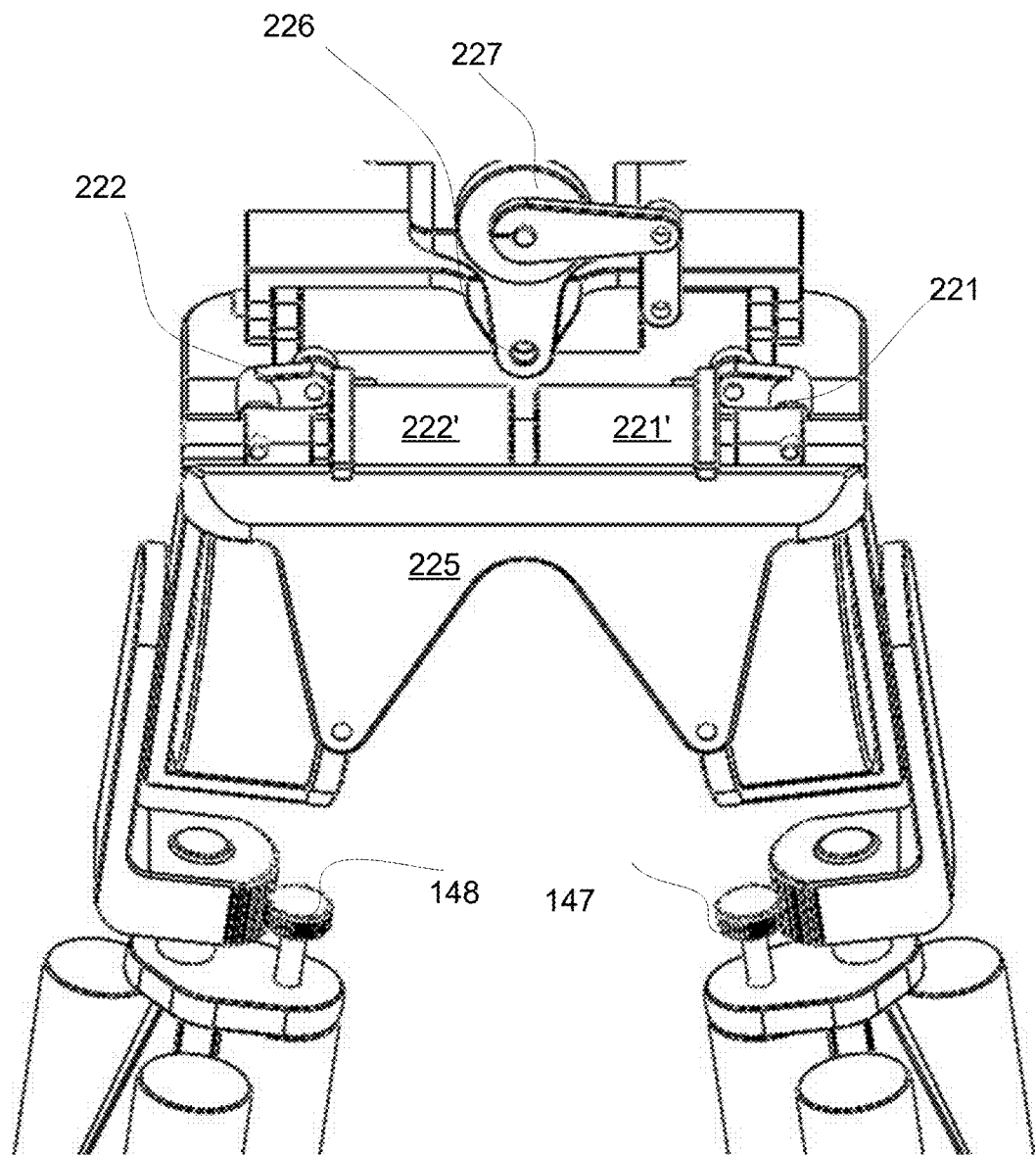
FIG. 23 is a perspective view of an example of the center of the HR wherein the lags of the HR are oriented to each other.
Figure 24:
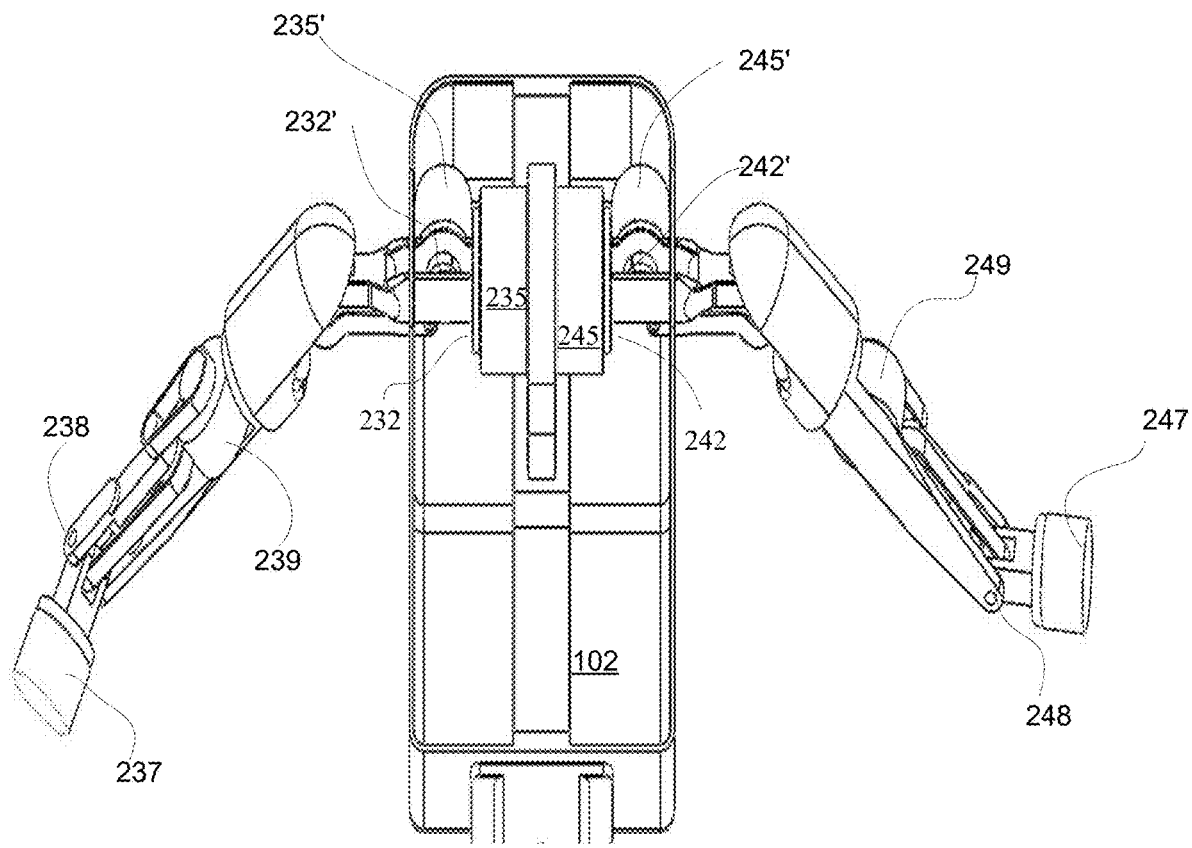
FIG. 24 is a front view of an example of an upper part of the HR, the upper part includes the torso and the hands of the HR.
Figure 25:
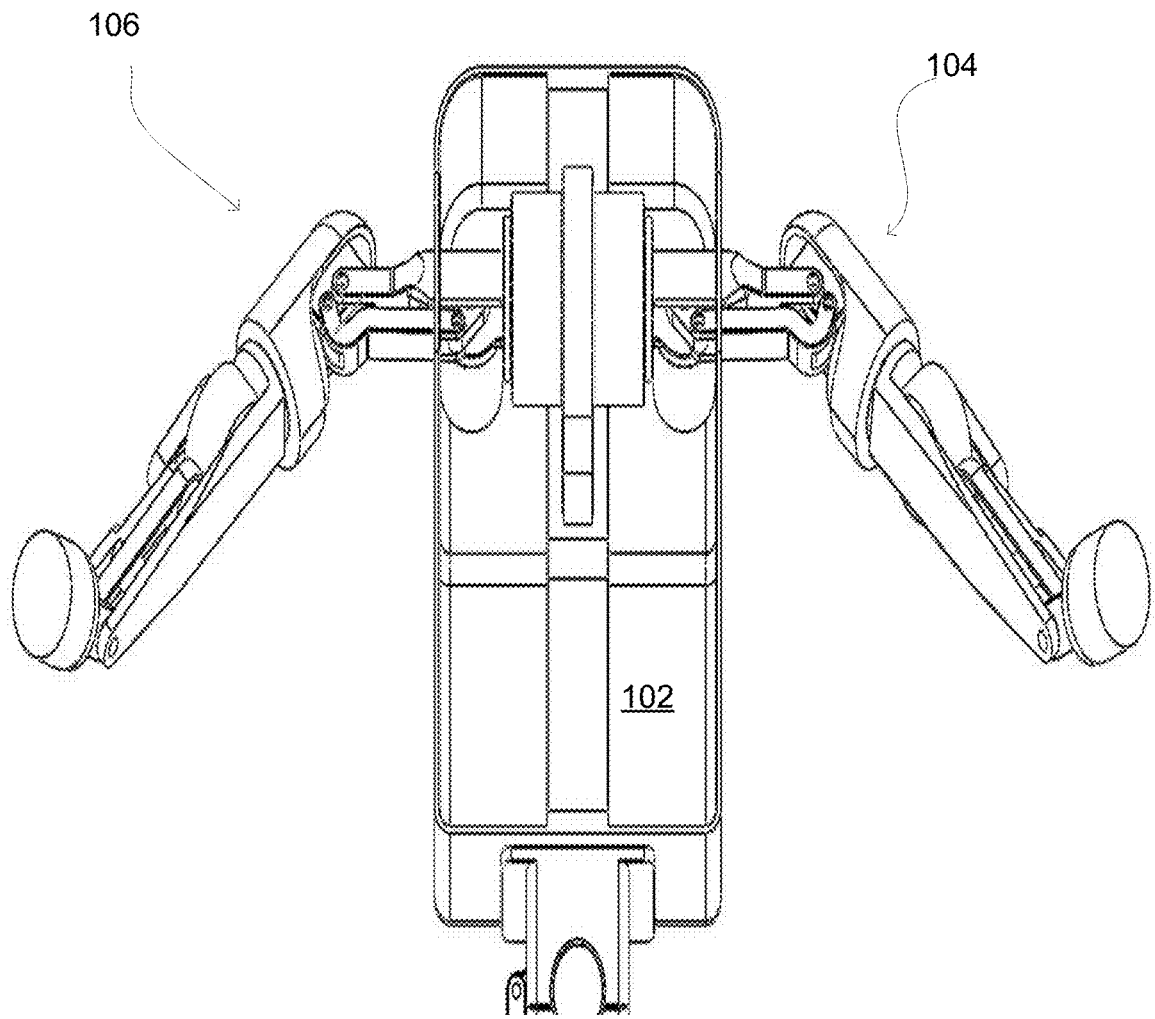
FIG. 25 is a front view of an example of an upper part of the HR.
Figure 26:
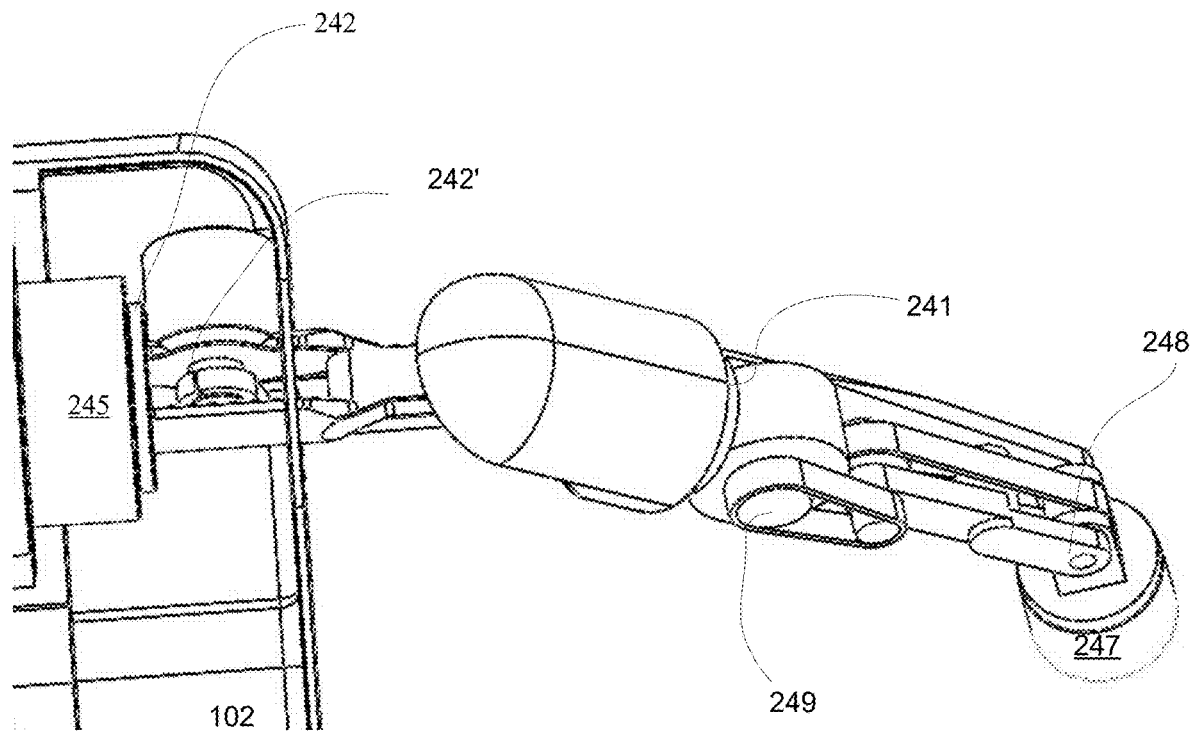
FIG. 26 is a front view of an example of a hand of the HR.
Figure 27:
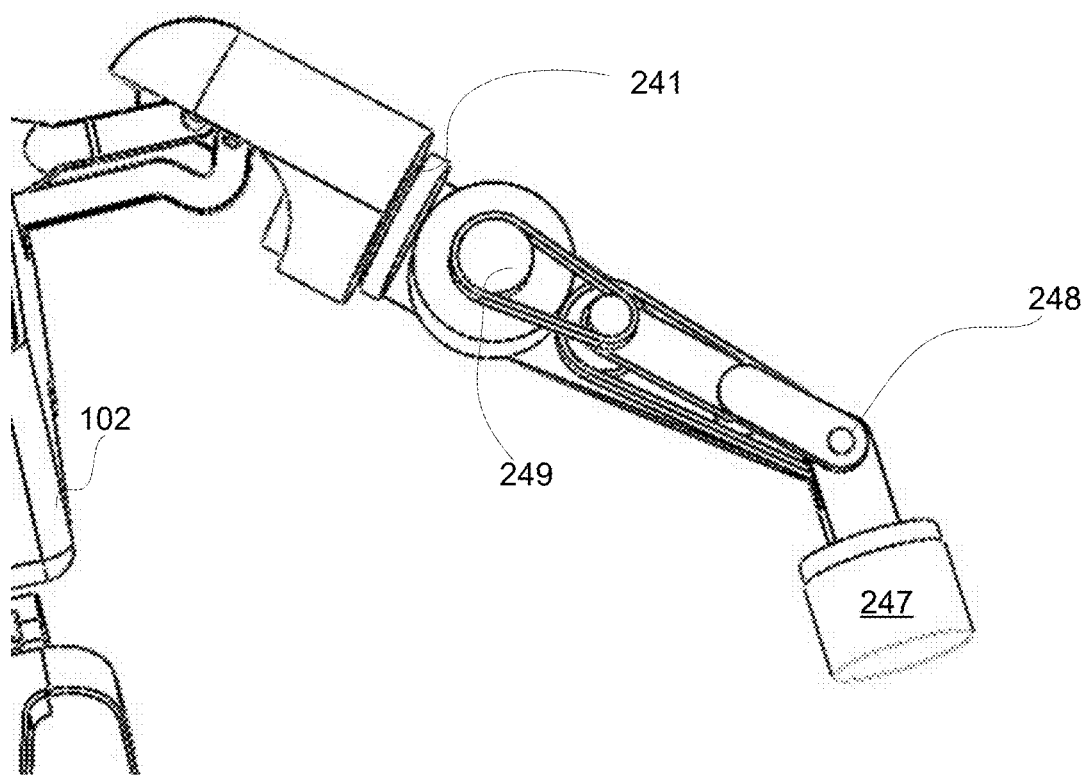
FIG. 27 is a front view of an example of a hand of the HR.
Figure 28:
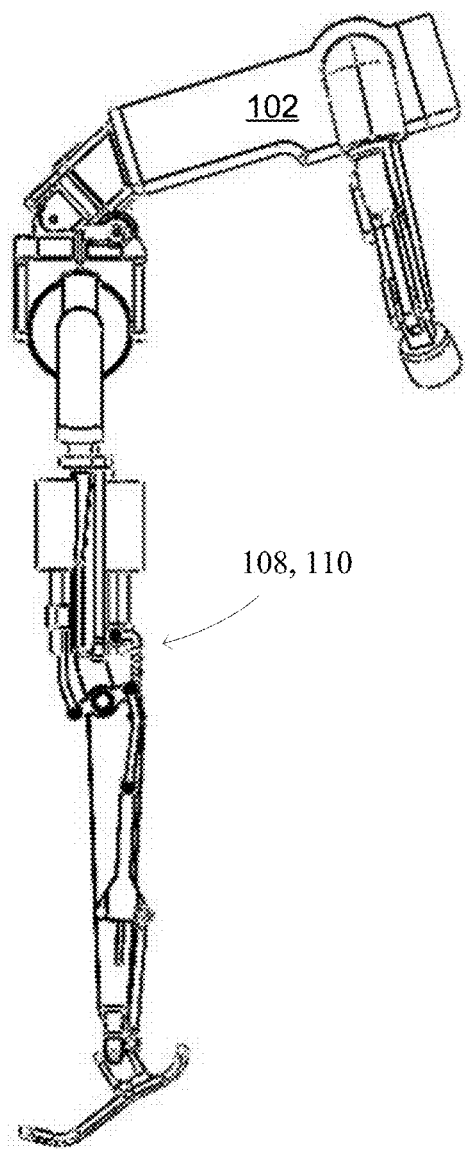
FIG. 28 is a side view of an example of the HR where the torso is tilted backwards.
Figure 29:
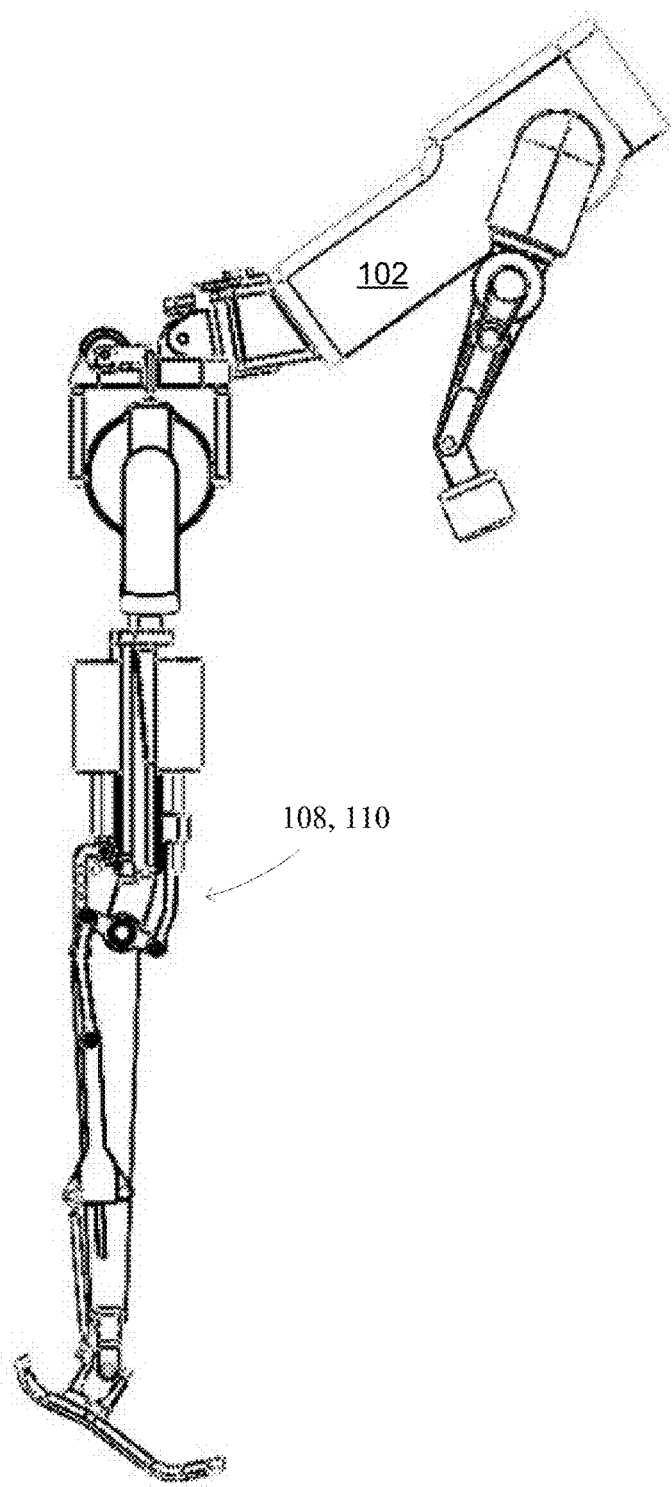
FIG. 29 is a side view of an example of the HR where the torso is tilted forwards.
Figure 30:
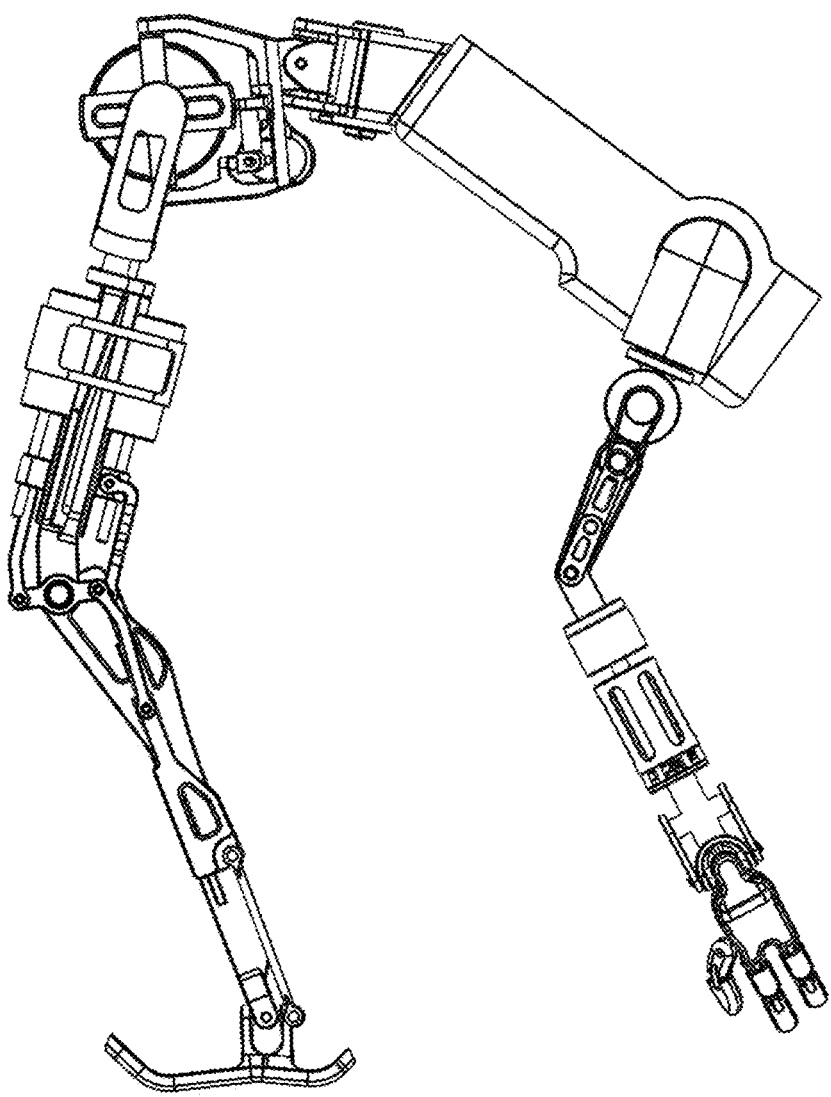
FIGS. 30-34 illustrate examples of the HR at different positions such a bottom front position and a bottom backwards position.
Figure 31:
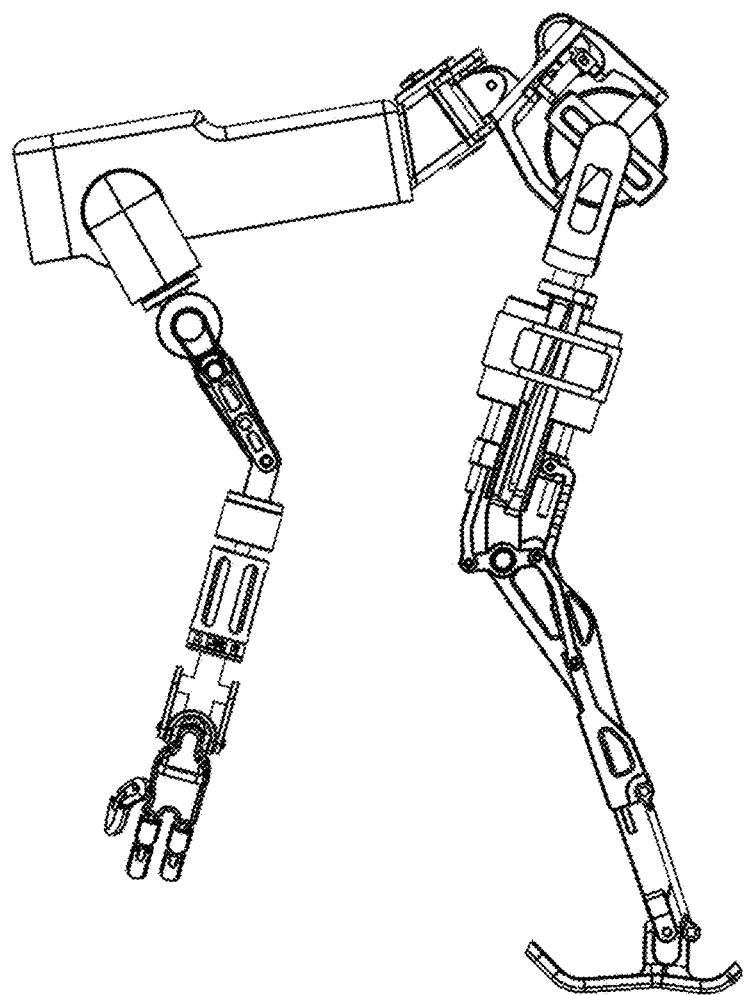
Figure 32:
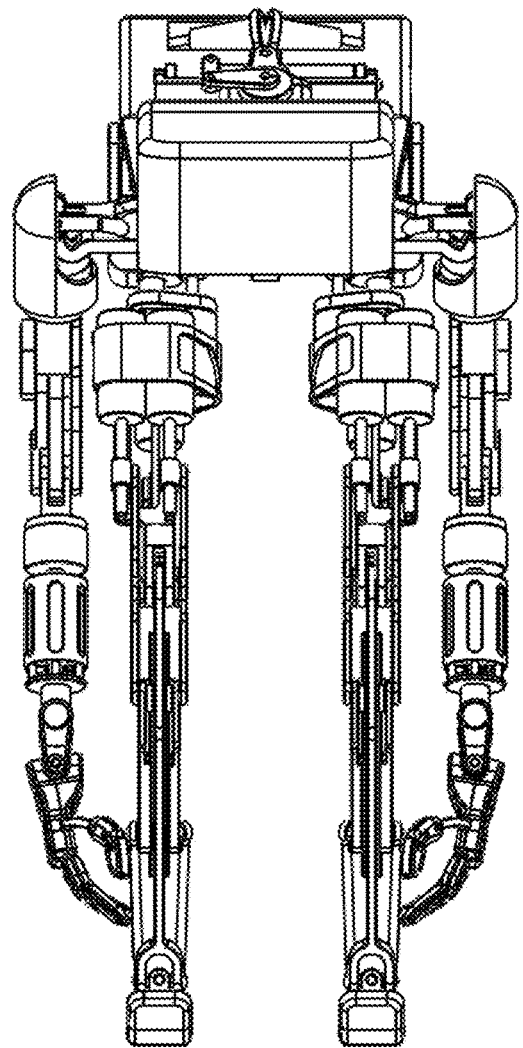
Figure 33:
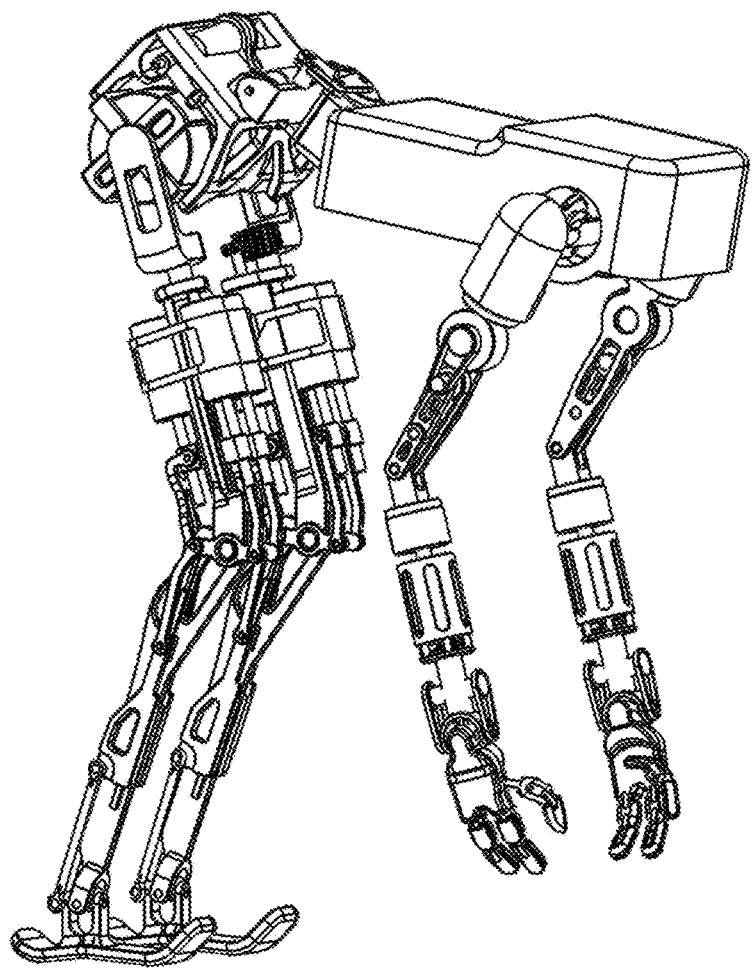
Figure 34:
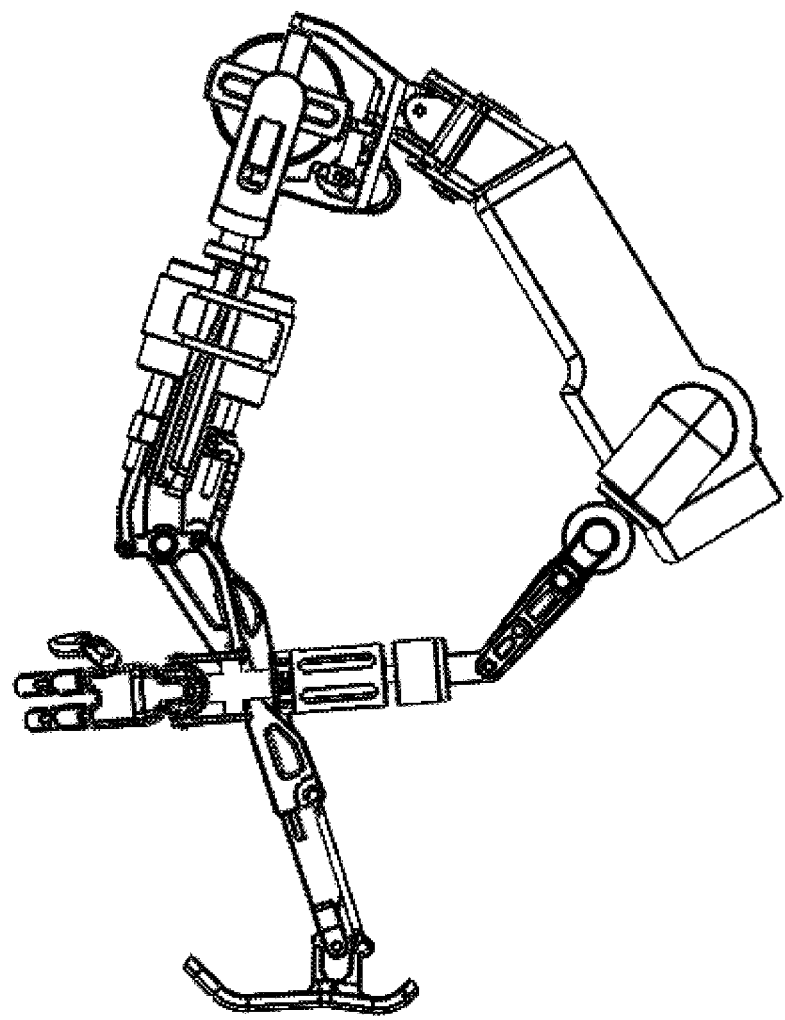

FIGS. 2-29 illustrate examples of the HR, and HR portions-some of which are at positioned at different positions. Especially FIGS. 2-4 illustrates examples of various components of the HR. FIG. 5 is a front view of an example of an HR where the torso parallel to the legs of the HR. FIG. 6 is a side view of an example of the HR where the torso is tilted backwards. FIG. 7 is a side view of an example of a leg of the HR. FIG. 8 is a front view of an example of two legs of the HR that are parallel to each other. FIG. 9 is a perspective view of an example of two legs of the HR. FIG. 10 is a perspective view of an example of a leg of the HR. FIG. 11 is a perspective view and a side view of an example of a knee of the HR. FIG. 12 is a side view of an example of a knee of the HR. FIG. 13 is a perspective view of an example of a knee of the HR. FIG. 14 is a perspective view of an example of a foot and an ankle of the HR. FIG. 15 is a perspective view of an example of a center of the HR. FIG. 16 is a front view of an example of a center of the HR. FIG. 17 is a front view of an example of the HR where the torso is rotated to the right of the HR. FIG. 18 is a front view of an example of the center of the HR where the torso is rotated to the right of the HR. FIG. 19 is a front view of an example of the center of the HR where the torso is rotated backwards. FIG. 20 is a perspective view of an example of the center of the HR where the torso is rotated forwards. FIG. 21 is a side view of an example of the HR where the torso is rotated forwards. FIG. 22 is a perspective view of an example of the center of the HR. FIG. 23 is a perspective view of an example of the center of the HR wherein the lags of the HR are oriented to each other. FIG. 24 is a front view of an example of an upper part of the HR, the upper part includes the torso and the hands of the HR. FIG. 25 is a front view of an example of an upper part of the HR. FIG. 26 is a front view of an example of a hand of the HR. FIG. 27 is a front view of an example of a hand of the HR. FIG. 28 is a side view of an example of the HR where the torso is tilted backwards. FIG. 29 is a side view of an example of the HR where the torso is tilted forwards.

It should be noted that the various motions of the mechanical parts of the HR may be controlled by one or more control units (denoted 400 in FIG. 5) and may be monitored by one or more sensors (motion sensors and/or acceleration sensors and/or position sensors and/or image sensors and the like)—denoted 402 in FIG. 4.

The HR 10 may include at least some of the following mechanical parts or elements: torso 102, a right hand 104, a left hand 106, a right leg 108, a left leg 110, a right thigh 112, a left thigh 114, a right shank 116, a left shank 118, a right knee 120, a left knee 122, a right foot 124, a left foot 126, a right ankle 128, a left ankle 130, a right knee joint 141, a left knee joint 142, and various motors and mechanical elements such as multiple transmission mechanisms.

Various motors and mechanical elements related to the legs and waist of the HR may include at least some out of an IR motor 131, an OR motor 132, an IL motor 133, an OL motor 134, a right yaw motor 135, a left yaw motor 136, a right roll motor 137, a left roll motor 138, a right knee motor 297, a left knee motor 298, an IR AR transmission mechanism 143, an OR AR transmission mechanism 144, an IL AR transmission mechanism 145, an OL AR transmission mechanism 146, a right gear 147, right teethed element 147', a left gear 148, left teethed element 148', a IR AR rotating joint 161, an OR AR rotating joint 162, an IL AR rotating joint 163, an OL AR rotating joint 164, IR ring 161', OR ring 162', IL ring 162' OL ring 164', an IR upper rotational to linear motion mechanism 165, an OR upper rotational to linear motion mechanism 166, an IL upper rotational to linear motion mechanism 167, an OL upper rotational to linear motion mechanism 167, an IR lower rotational to linear motion mechanism 171, an OR lower rotational to linear motion mechanism 172, an IL lower rotational to linear motion mechanism 173, an OL lower rotational to linear motion mechanism 174, an IR mechanical link protection unit 181, an OR mechanical link protection unit 182, an IL mechanical link protection unit 183, an OL mechanical link protection unit 184, right knee mechanical link 185, left knee mechanical link 185', lower thigh joint 186, upper shank joint 187, IR upper AR mechanical link 191, OR upper AR mechanical link 192, IL upper AR mechanical link 193, OL upper AR mechanical link 194, IR intermediate AR mechanical link 195, OR intermediate AR mechanical link 196, IL intermediate AR mechanical link 197, OL intermediate AR mechanical link 198, IR lower AR mechanical link 201, OR lower AR mechanical link 202, IL lower AR mechanical link 203, OL lower AR mechanical link 204, right ankle 205, left ankle 206, right shank base 207, left shank base 208, right foot 124, left foot 126, right ankle joint 211, left ankle joint 212, IR ankle interface 213, OR ankle interface 214, IL ankle interface 215, OL ankle interface 216, right hip pitch joint 221, right hip pitch motor 221', left hip pitch joint 222, left hip pitch motor 222', right hip roll joint 223, left hip roll joint 224, waist frame 225, IR threaded mechanical element 261, OR threaded mechanical element 262, IL threaded mechanical element 263, OR threaded mechanical element 264, IR nut 265, OR nut 266, IL nut 267, OL nut 268, First IR AR rotational joint 271, Second IR AR rotational joint 272, First OR AR rotational joint 273, Second OR AR rotational joint 274, First IL AR rotational joint 275, Second IL AR rotational joint 276, First OL AR rotational joint 277, Second OL AR rotational joint 278, Right knee motor 297, Left Knee motor 298, Right knee threaded mechanical element 301, Right Knee nut 302, Right knee upper rotational joint 303, Right knee lower rotational joint 304, Left Knee threaded mechanical element 305, Left Knee nut 306, Left knee upper rotational joint 307, Left Knee lower rotational joint 308, Right shank top 311, Left shank top 312, Right hip pitch motor 221', Left hip pitch motor 222', Right hip roll motor 223', Left hip roll motor 224'.

The various motors and mechanical elements related to the torso and the hands of the HR may include at least some of the following: torso roll joint 226, torso roll motor 227, torso pitch joint 228, torso pitch motor 229, right hand transmission mechanism 230, right elbow joint 231, right shoulder pitch joint 232, right shoulder yaw joint 232', right elbow motor 234, right shoulder pitch motor 235, right shoulder yaw motor 235', right elbow joint 236, right hand segment 237, right wrist joint 238, right wrist motor 239, left hand transmission mechanism 240, left elbow joint 241, left shoulder pitch joint 242, left shoulder yaw joint 242', left elbow motor 244, left shoulder pitch motor 245, left shoulder yaw motor 245', left elbow joint 246, left hand segment 247, left wrist joint 248 and left wrist motor 249.

Legs

The right leg 108 may include right thigh 112, right shank 116, right knee 120 (includes right knee joint 141), right foot 124, right ankle 128, and various right leg motors and right leg mechanical elements such as right leg transmission mechanisms.

The right leg may include (a) IR motor and transmission mechanism, (b) OR motor and transmission mechanism, and (c) a right KR transmission mechanism.

The left leg may include (a) IL motor and transmission mechanism, (b) OL motor and transmission mechanism, and (c) a left KR transmission mechanism.

Ankles Movements

Control of right ankle movements by inner right mechanical components

The IR motor and transmission mechanism may include IR motor 131 and IR AR transmission mechanism 143.

IR AR transmission mechanism 143 may include (from top to bottom) IR upper rotational to linear motion mechanism 165, AR rotating joint 161 and IR lower rotational to linear motion mechanism 171.

The IR motor 131 may be a rotational IR motor in the sense that the motor rotates a mechanical element such as an IR threaded mechanical element 261.

The IR upper rotational to linear motion mechanism 165 may include a IR nut 265 with an internal screw thread for converting the rotation of the IR threaded mechanical element 261 to a linear movement of the IR nut 265. The IR nut may be located above the knee joint. A IR upper AR mechanical link 191 has an upper end that is rotatably coupled (via a first IR AR rotational joint 271) to the IR nut 265, and another end that is rotatably coupled (via a second IR AR rotational joint 274) to a first point of the IR AR rotating joint 161.

IR AR rotating joint 161 is rotatable about a AR rotation axis and is configured to convert, by rotation, the first linear movement to a second linear movement.

An upper end of IR intermediate AR mechanical link 195 is rotatably coupled to a second point of the IR AR rotating joint 161 and is configured to perform the second linear movement.

A lower end of the IR intermediate AR mechanical link 195 may be rotatably coupled to an upper end of IR mechanical link protection unit 181. A lower end of IR mechanical link protection unit 181 is rotatably coupled to an upper end of IR lower AR mechanical link 201. The lower end of IR lower AR mechanical link 201 interfaces with an IR ankle interface 213 such as a ball joint to the right ankle joint 211.

The right ankle joint 211 introduces yaw and pitch rotations in relation to the right shank base 207.

The OR motor and transmission mechanism may include OR motor 132 and OR AR transmission mechanism 144.

OR AR transmission mechanism 144 may include (from top to bottom) OR upper rotational to linear motion mechanism 166, AR rotating joint 162 and OR lower rotational to linear motion mechanism 172.

The OR motor 132 may be a rotational OR motor in the sense that the motor rotates a mechanical element such as an OR threaded mechanical element 262.

The OR upper rotational to linear motion mechanism 166 may include a OR nut 266 with an internal screw thread for converting the rotation of the OR threaded mechanical element 262 to a linear movement of the OR nut 266. The OR nut may be located above the knee joint. OR upper AR mechanical link 192 has an upper end that is rotatably coupled (via a first OR AR rotational joint 273) to the OR nut 266, and another end that is rotatably coupled (via a second OR AR rotational joint 274) to a first point of the OR AR rotating joint 162.

OR AR rotating joint 162 is rotatable about a OR AR rotation axis and is configured to convert, by rotation, the first linear movement to a second linear movement.

An upper end of OR intermediate AR mechanical link 196 is rotatably coupled to a second point of the OR AR rotating joint 162 and is configured to perform the second linear movement.

A lower end of the OR intermediate AR mechanical link 196 may be rotatably coupled to an upper end of OR mechanical link protection unit 182. A lower end of OR mechanical link protection unit 182 is rotatably coupled to an upper end of OR lower AR mechanical link 202. The lower end of OR lower AR mechanical link 202 interfaces with an OR ankle interface 214 such as a ball joint to the right ankle joint 211.

The right ankle joint 211 introduces yaw and pitch rotations in relation to the right shank base 207.

Any reference to the IR motor and transmission mechanism should be applied mutatis mutandis to the OR motor and transmission mechanism and/or to the IL motor and transmission mechanism and/or to the OL motor and transmission mechanism. For brevity of explanation the previous text referred only to the movement of the right ankle.

The IL motor and transmission mechanism may include IL motor 133 and IL AR transmission mechanism 145.

IL AR transmission mechanism 145 may include (from top to bottom) IL upper rotational to linear motion mechanism 165, AR rotating joint 163 and IL lower rotational to linear motion mechanism 173.

The IL motor 133 may be a rotational IL motor in the sense that the motor rotates a mechanical element such as an IL threaded mechanical element 263.

The IL upper rotational to linear motion mechanism 165 may include a IL nut 267 with an internal screw thread for converting the rotation of the IL threaded mechanical element 263 to a linear movement of the IL nut 267. The IL nut may be located above the knee joint. A IL upper AR mechanical link 193 has an upper end that is rotatably coupled (via a first IL AR rotational joint 271) to the IL nut 267, and another end that is rotatably coupled (via a second IL AR rotational joint 276) to a first point of the IL AR rotating joint 163.

IL AR rotating joint 163 is rotatable about a AR rotation axis and is configured to convert, by rotation, the first linear movement to a second linear movement.

An upper end of IL intermediate AR mechanical link 197 is rotatably coupled to a second point of the IL AR rotating joint 163 and is configured to perform the second linear movement.

A lower end of the IL intermediate AR mechanical link 197 may be rotatably coupled to an upper end of IL mechanical link protection unit 183. A lower end of IL mechanical link protection unit 183 is rotatably coupled to an upper end of IL lower AR mechanical link 203. The lower end of IL lower AR mechanical link 203 interfaces with an IL ankle interface 215 such as a ball joint to the left ankle joint 212.

The left ankle joint 212 introduces yaw and pitch rotations in relation to the left shank base 208.

The OL motor and transmission mechanism may include OL motor 134 and OL AR transmission mechanism 146.

OL AR transmission mechanism 146 may include (from top to bottom) OL upper rotational to linear motion mechanism 166, AR rotating joint 164 and OL lower rotational to linear motion mechanism 174.

The OL motor 134 may be a rotational OL motor in the sense that the motor rotates a mechanical element such as an OL threaded mechanical element 264.

The OL upper rotational to linear motion mechanism 166 may include a OL nut 268 with an internal screw thread for converting the rotation of the OL threaded mechanical element 264 to a linear movement of the OL nut 268. The OL nut may be located above the knee joint. OL upper AR mechanical link 194 has an upper end that is rotatably coupled (via a first OL AR rotational joint 273) to the OL nut 268, and another end that is rotatably coupled (via a second OL AR rotational joint 274) to a first point of the OL AR rotating joint 164.

OL AR rotating joint 164 is rotatable about a OL AR rotation axis and is configured to convert, by rotation, the first linear movement to a second linear movement.

An upper end of OL intermediate AR mechanical link 198 is rotatably coupled to a second point of the OL AR rotating joint 164 and is configured to perform the second linear movement.

A lower end of the OL intermediate AR mechanical link 198 may be rotatably coupled to an upper end of OL mechanical link protection unit 184. A lower end of OL mechanical link protection unit 184 is rotatably coupled to an upper end of OL lower AR mechanical link 204. The lower end of OL lower AR mechanical link 204 interfaces with an OL ankle interface 216 such as a ball joint to the left ankle joint 212.

The left ankle joint 212 introduces yaw and pitch rotations in relation to the left shank base 207.

Right Knee Movements

The right knee movement is mainly controlled by the right KR transmission mechanism and the right knee motor 297.

The right knee motor 297 is a rotational motor in the sense that the motor rotates a mechanical element such as a right knee threaded mechanical element 301.

Right knee nut 302 has an internal screw thread and is configured to convert the rotation of the right knee threaded mechanical element 301 to a linear movement of the right knee nut 302. The right knee nut 302 may be located above the knee joint. Right knee mechanical link 185 has an upper end that is rotatably coupled (via right knee upper rotational joint 303) to the right knee nut 202, and another end that is rotatably coupled (via right knee lower rotational joint 304) to a right shank top 311—thereby controlling a pitch rotation of the right knee.

Left Knee Movement

The left knee movement is mainly controlled by the left KR transmission mechanism and the left knee motor 298.

The left knee motor 298 is a rotational motor in the sense that the motor rotates a mechanical element such as a left knee threaded mechanical element 305.

Left knee nut 306 has an internal screw thread and is configured to convert the rotation of the left knee threaded mechanical element 305 to a linear movement of the left knee nut 306. The left knee nut 306 may be located above the knee joint. Left knee mechanical link 186 has an upper end that is rotatably coupled (via left knee upper rotational joint 307) to the left knee nut 306, and another end that is rotatably coupled (via left knee lower rotational joint 308) to a left shank top 312—thereby controlling a pitch rotation of the left knee.

The right leg and the left legs may also perform a roll rotation.

Right Arm Movements

The right arm can perform right shoulder pitch and yaw rotations using right shoulder pitch joint 232 and right shoulder yaw joint 232' that are movable by right shoulder pitch motor 235 and right shoulder yaw motor 235'.

The right elbow may perform roll rotations using right elbow joint 231 that is movable by right elbow motor 234.

The right wrist may perform pitch rotations for rotating the right hand segment 237 that may include any interface such as three fingers. The pitch rotations are executed using right wrist joint 238 movable by right wrist motor 239.

The right arm includes various transmission mechanisms that were emitted from the description for sake of brevity of explanation.

Left Arm Movements

The left arm can perform left shoulder pitch and yaw rotations using left shoulder pitch joint 242 and left shoulder yaw joint 242' that are movable by left shoulder pitch motor 245 and left shoulder yaw motor 245'.

The left elbow may perform roll rotations using left elbow joint 241 that is movable by left elbow motor 244.

The left wrist may perform pitch rotations for rotating the left hand segment 247 that may include any interface such as three fingers. The pitch rotations are executed using left wrist joint 248 movable by left wrist motor 249.

The left arm includes various transmission mechanisms that were emitted from the description for sake of brevity of explanation.

Torso Movements

The torso may perform pitch and roll rotations using torso roll joint 226 that is movable by torso roll motor 227, and torso pitch joint 228 that is movable by torso pitch motor 229.

As indicated in FIG. 1—the HR may perform various rotational movements in order to mimic human movement—and also to perform additional movements not executable by a human—for example moving the arms between (i) a bottom front position in which the hands are in front of the torso and below the torso, and (ii) a bottom rear position in which the hands are behind the torso and below the torso. This movement allows the HR to pick objects located in front of the HR and behind the HR without moving the torso or performing a yaw rotation of most of the HR—thereby allowing the HR to operate in narrow locations (for example between two kitchen platforms that are close to each other).

The HR may have a center of gravity (COG) that is located above the knee joint—which allows the HR to perform various movements while maintaining stable—and while reducing the impact of various leg and hands movements on the COG.

The HR has a compact and lean frame—especially at the knees and below the knees—which enables to reduce the impact of knee and ankle movement on the COG.

The HR, as indicated by the kinematic structure of FIG. 1—has multiple joints—but most of the joints are not three degrees of freedom joints—in order to reduce the weights, the complexity and the power required for rotations—per each joint. For example—the torso joints provide a relatively limited roll rotation as well as a pitch rotation—which greatly simplifies the movement of the torso—and reduces the weight and size of the motors and other mechanical parts required to support the rotations of the torso.

There may be provided one or more HR legs, wherein each HR leg may include (a) a shank, (b) an ankle that includes an ankle joint that is configured to perform yaw and pitch rotations, (c) a knee joint, (d) multiple ankle related (AR) rotational motors that are in mechanical communication, via multiple AR transmission mechanisms, with the ankle joint, and (e) a knee related (KR) rotational motor that is in mechanical communication, via a KR transmission mechanism, with the knee joint. The multiple AR rotational motors and the KR rotational motor are positioned above the knee joint. This configuration assists in setting the COG to be above the knee of the HR, and provide a rigid, lean, and low weight below the knee HR leg structure.

The right leg may also include a yaw rotational motor. See, for example right yaw motor 135 of the right leg that rotates right gear 147 that rotates about right teethed element 147' and rotates the lower part of the leg below the right gear, and left yaw motor 136 of the left leg that rotates left gear 148 that rotates the lower part of the left leg below the left gear.

The left leg may also include a yaw rotational motor. See, for example left yaw motor 136 of the left leg that rotates left gear 148 that rotates about left teethed element 148' and rotates the lower part of the leg below the left gear, and left yaw motor 136 of the left leg that rotates left gear 148 that rotates the lower part of the left leg below the left gear.

A yaw rotational motor that is positioned above the knee joint and is in mechanical communication with a gear that is configured to perform a yaw rotation of at least the knee joint and the shank. This also assists in defining the COG above the knee and also introduced a new degree of freedom to the movement of the knee and shank.

The multiple AR transmission mechanisms may include AR rotating joints that are located in proximity to the knee joint and are positioned at opposite sides of the knee joint. See, for example—OL AR rotating joint, IL AR rotating joint, OR AR rotating joint and IR AR rotating joint.

The multiple AR transmission mechanisms may include AR rotating joints that are thin. This contributes to the compactness of the leg—and also allows the HR to include a relatively narrow knee—which mimics a human knee.

The multiple AR transmission mechanisms may include AR rotating joints that rotate about a AR rotation axis that is proximate (and may be equal) to a rotation axis of the knee joint. This eases the control of the different motors and joints.

The AR transmission mechanism may include an upper rotational to linear motion mechanism that is configured to convert a rotational motion of a AR rotational motor to a first linear movement. The upper rotational to linear motion mechanism may be positioned above the knee joint.

The AR transmission mechanism may also include an AR rotating joint that is rotatable about a AR rotation axis and is configured to convert, by rotation, the first linear movement to a second linear movement.

The AR transmission mechanism may also include a lower AR transmission mechanism that translates the second linear movement to a movement of an first interfacing point of the ankle.

The upper rotational to linear motion mechanism, the AR rotating joint and the lower rotational to linear motion mechanism provide a mechanically efficient, lightweight and slim transfer sub-unit that converts the rotational movement of a AR motor to a movement of the ankle.

The lower AR transmission mechanism may include a mechanical link protection unit that is configured to prevent buckling of mechanical links of the lower AR transmission mechanism.

The lower AR transmission mechanism may include an upper mechanical link, a mechanical link protection unit and an ankle mechanical link.

One end of the upper mechanical link may be in mechanical communication with one end of the AR rotating joint and with a first end of mechanical link protection unit. One end of the ankle mechanical link is in mechanical communication with another end of the mechanical link protection unit and with a first contact point with the ankle.

The rotational movement of the AR rotational movement may be a rotational movement of a threaded mechanical element, and wherein the AR transmission mechanism comprises a nut with an internal screw thread, wherein the nut is located above the knee joint.

A HR leg may include a pitch hip joint and a pitch hip motor that are positioned above the multiple AR rotational motors and are configured to perform pitch rotations of the humanoid robot leg. See, for example right hip pitch joint 221 and left hip pitch joint 222 that are movable by right hip pitch motor 221' and left hip pitch motor 222', respectively.

A HR leg may include a roll hip joint and a roll hip motor—for example, right hip roll joint 223, left hip roll joint 224 that are movable by right hip roll motor 223' and left hip roll motor 224', respectively.

The roll motors are positioned above the multiple AR rotational motors and are configured to perform roll rotations of the HR legs.

The roll rotations may be limited to increase the angle between the left leg and the right leg—for example within an angular range of zero to ninety degrees, zero to sixty degrees, zero to forty five degrees, zero to thirty degrees, zero and above ninety degrees, and the like. The limited angular range simplifies the roll related joints and movements and reduces their weight.

There may be provided one or more HR legs, wherein each HR leg may include (a) a shank, (b) an ankle that comprises an ankle joint that is configured to perform yaw and pitch rotations, (c) a knee joint, (d) multiple ankle related (AR) rotational motors that are in mechanical communication, via multiple AR transmission mechanisms, with the ankle joint; wherein a AR transmission mechanism comprises a AR rotating joint that is connected to an upper link and to a lower link, wherein the AR rotating joint is configured to convert a linear motion of the upper link to a linear motion of the lower link; (e) upper rotational to linear motion mechanisms, wherein an upper rotational to linear motion mechanism is configured to convert a rotational motion of a AR rotational motor to a first linear movement that drives the upper link. The multiple AR rotational motors and the KR rotational motor are positioned above the knee joint.

There may be provided one or more HR legs, wherein each HR leg may include (a) a shank; (b) leg joints that include an ankle joint and a knee joint; (c) multiple rotational motors that are in mechanical communication, via multiple transmission mechanisms with the leg joints. The multiple rotational motors may be independently controlled in the sense that each rotational motor may receive and execute commands regardless of the ither rotational motors. At least one leg joint may be impacted by a movement of two or more rotational motors of the multiple rotational motors. The multiple rotational motors are positioned above a knee joint of the leg joints.

For example—the transmission mechanisms may include threaded mechanical elements that are rotatable by the multiple rotational motors, and nuts with internal screw threads that are coupled to the threaded mechanical elements.

An AR transmission mechanism may be configured to convert a rotational movement of a AR threaded mechanical element that is rotated by a AR rotational motor to a linear movement of a AR nut.

A movement of the knee joint by a KR transmission mechanism may be translated to a movement of the AR nut.

For example—the movement of the KR motor may result in a pitch movement of the shank in relation to the thigh—which may move the AR nuts in relation to the AR threaded mechanical element.

There may be provided a HR that may include (a) arms that include hands, (b) a torso, (c) a waist, (d) shoulder joints that are configured to mechanically couple the arms to the torso, (e) one or more waist joints that are configured to mechanically couple the torso to the waist, (f) multiple legs that comprise multiple knee joints, and (g) hip joints that are configured to mechanically couple the multiple legs to the waist. The humanoid robot may be configured to move the arms between (i) a bottom front position in which the hands are in front of the torso and below the torso, and (ii) a bottom rear position in which the hands are behind the torso and below the torso.

The HR is configured to move the arm between the bottom front position and the bottom rear position without rotating the torso about a yaw axis.

The HR may be configured to move the arm between the bottom front position and the bottom rear position by rotating the torso about a yaw axis and rotating the shoulder joints about a yaw axis.

The hands may be configured to hold an object during a movement of the arms between the bottom front position and the bottom rear position.

The torso is an upmost part of the humanoid robot. Thus—the upper facet of the torso may be the highest part of the HR—and the HR may not include a head that extends from the torso.

The HR may include a display that covers a majority of the torso.

It should be noted that the HR may include only some of the mentioned above mechanical elements and/or may include additional mechanical elements.

FIGS. 30-34 illustrate examples of the HR at different positions such a bottom front position and a bottom backwards position.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A humanoid robot leg comprising:
   a shank;
   an ankle that comprises an ankle joint that is configured to perform yaw and pitch rotations;
   a knee joint;
   multiple ankle related (AR) rotational motors that are in mechanical communication, via multiple AR transmission mechanisms, with the ankle joint;
   a knee related (KR) rotational motor that is in mechanical communication, via a KR transmission mechanism, with the knee joint;
   wherein the multiple AR rotational motors and the KR rotational motor are positioned above the knee joint;
   wherein the multiple AR transmission mechanisms comprise AR rotating joints that are located in proximity to the knee joint and are positioned at opposite sides of the knee joint.

2. A humanoid robot leg comprising:
   a shank;
   an ankle that comprises an ankle joint that is configured to perform yaw and pitch rotations;
   a knee joint;
   multiple ankle related (AR) rotational motors that are in mechanical communication, via multiple AR transmission mechanisms, with the ankle joint;
   a knee related (KR) rotational motor that is in mechanical communication, via a KR transmission mechanism, with the knee joint;
   wherein the multiple AR rotational motors and the KR rotational motor are positioned above the knee joint;
   wherein the multiple AR transmission mechanisms comprise AR rotating joints that are thin.

3. A humanoid robot leg comprising:
   a shank;
   an ankle that comprises an ankle joint that is configured to perform yaw and pitch rotations;
   a knee joint;
   multiple ankle related (AR) rotational motors that are in mechanical communication, via multiple AR transmission mechanisms, with the ankle joint;
   a knee related (KR) rotational motor that is in mechanical communication, via a KR transmission mechanism, with the knee joint;
   wherein the multiple AR rotational motors and the KR rotational motor are positioned above the knee joint;
   wherein the multiple AR transmission mechanisms comprise AR rotating joints that rotate about a AR rotation axis that is proximate to a rotation axis of the knee joint.

4. A humanoid robot leg comprising:
a shank;
an ankle that comprises an ankle joint that is configured to perform yaw and pitch rotations;
a knee joint;
multiple ankle related (AR) rotational motors that are in mechanical communication, via multiple AR transmission mechanisms, with the ankle joint;
a knee related (KR) rotational motor that is in mechanical communication, via a KR transmission mechanism, with the knee joint;
wherein the multiple AR rotational motors and the KR rotational motor are positioned above the knee joint;
wherein the multiple AR transmission mechanisms comprise AR rotating joints that rotate about a AR rotation axis that equals a rotation axis of the knee joint.

5. A humanoid robot leg comprising:
a shank;
an ankle that comprises an ankle joint that is configured to perform yaw and pitch rotations;
a knee joint;
multiple ankle related (AR) rotational motors that are in mechanical communication, via multiple AR transmission mechanisms, with the ankle joint;
a knee related (KR) rotational motor that is in mechanical communication, via a KR transmission mechanism, with the knee joint;
wherein the multiple AR rotational motors and the KR rotational motor are positioned above the knee joint;
wherein an AR transmission mechanism comprises an upper rotational to linear motion mechanism that is configured to convert a rotational motion of an AR rotational motor to a first linear movement.

6. The humanoid robot leg according to claim 5 wherein the upper rotational to linear motion mechanism is positioned above the knee joint.

7. The humanoid robot leg according to claim 5 wherein the AR transmission mechanism also comprises an AR rotating joint that is rotatable about a AR rotation axis and is configured to convert, by rotation, the first linear movement to a second linear movement.

8. The humanoid robot leg according to claim 7 wherein the AR transmission mechanism also comprises a lower AR transmission mechanism that translates the second linear movement to a movement of a first interfacing point of the ankle.

9. The humanoid robot leg according to claim 8 wherein the lower AR transmission mechanism comprises a mechanical link protection unit that is configured to prevent buckling of mechanical links of the lower AR transmission mechanism.

10. The humanoid robot leg according to claim 8 wherein the lower AR transmission mechanism comprises an upper mechanical link, a mechanical link protection unit and an ankle mechanical link.

11. The humanoid robot leg according to claim 10 wherein one end of the upper mechanical link is in mechanical communication with one end of the AR rotating joint and with a first end of mechanical link protection unit; and wherein one end of the ankle mechanical link is in mechanical communication with another end of the mechanical link protection unit and with a first contact point with the ankle.

12. The humanoid robot leg according to claim 5 wherein the rotational movement of the AR rotational movement is a rotational movement of a threaded mechanical element, and wherein the AR transmission mechanism comprises a nut with an internal screw thread, wherein the nut is located above the knee joint.

13. A humanoid robot leg comprising:
a shank;
an ankle that comprises an ankle joint that is configured to perform yaw and pitch rotations;
a knee joint;
multiple ankle related (AR) rotational motors that are in mechanical communication, via multiple AR transmission mechanisms, with the ankle joint;
a knee related (KR) rotational motor that is in mechanical communication, via a KR transmission mechanism, with the knee joint;
wherein the multiple AR rotational motors and the KR rotational motor are positioned above the knee joint;
wherein the humanoid robot leg further comprises a pitch hip joint and a pitch hip motor that are positioned above the multiple AR rotational motors and are configured to perform pitch rotations of the humanoid robot leg.

14. A humanoid robot leg comprising:
a shank;
an ankle that comprises an ankle joint that is configured to perform yaw and pitch rotations;
a knee joint;
multiple ankle related (AR) rotational motors that are in mechanical communication, via multiple AR transmission mechanisms, with the ankle joint;
a knee related (KR) rotational motor that is in mechanical communication, via a KR transmission mechanism, with the knee joint;
wherein the multiple AR rotational motors and the KR rotational motor are positioned above the knee joint;
wherein the humanoid robot leg further comprises a roll hip joint and a roll hip motor that are positioned above the multiple AR rotational motors and are configured to perform roll rotations of the humanoid robot leg.

* * * * *